(12) United States Patent
Fukuta et al.

(10) Patent No.: US 7,865,718 B2
(45) Date of Patent: Jan. 4, 2011

(54) COMPUTER-READABLE RECORDING MEDIUM RECORDING REMOTE CONTROL PROGRAM, PORTABLE TERMINAL DEVICE AND GATEWAY DEVICE

(75) Inventors: Shigeki Fukuta, Kawasaki (JP); Takao Mohri, Kawasaki (JP); Hideki Mitsunobu, Kawasaki (JP); Nami Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 806 days.

(21) Appl. No.: 11/892,141

(22) Filed: Aug. 20, 2007

(65) Prior Publication Data

US 2008/0104391 A1    May 1, 2008

(30) Foreign Application Priority Data

Oct. 26, 2006    (JP)    ............................. 2006-291216

(51) Int. Cl.
*H04L 29/06*    (2006.01)
(52) U.S. Cl. .......................... 713/153; 713/154; 726/11; 380/247
(58) Field of Classification Search .................. 713/153, 713/154; 705/79; 380/247; 726/11, 12
See application file for complete search history.

(56) References Cited

U.S. PATENT DOCUMENTS 7,706,344 B2 *    4/2010    Kobayashi et al. .......... 370/338
2007/0201418 A1 *    8/2007    Kobayashi et al. .......... 370/338
2008/0037486 A1 *    2/2008    Gerling et al. .............. 370/338

OTHER PUBLICATIONS

Patent Abstract of Japan, Japanese Publication No. 2002-032286, Published Jan. 31, 2002.
Patent Abstract of Japan, Japanese Publication No. 2000-188616, Published Jul. 4, 2000.

* cited by examiner

*Primary Examiner*—Kimyen Vu
*Assistant Examiner*—April Y Shan
(74) *Attorney, Agent, or Firm*—Staas & Halsey LLP

(57) ABSTRACT

A computer-readable recording medium which records a remote control program for allowing data on a network protected by a gateway device to be transferred to an external device by external remote-control operations; a portable terminal device; and a gateway device. The terminal device transmits to the gateway device an access ticket issue request. The gateway device generates key information and transmits to the terminal device an access ticket including the key information. The terminal device transfers to a data acquisition device a data acquisition instruction including the acquired access ticket. The acquisition device transmits to the gateway device a data request including the key information. When the key information added to the access ticket and the key information included in the data request are the same, the gateway device transfers the data request to a data server device. The server device transfers the data to the acquisition device.

10 Claims, 27 Drawing Sheets

43 DATA LIST REQUEST

DATA LIST BROWSING
PATH : VideoData
LIST UPPER LIMIT : 100

44 DATA LIST

DATA LIST BROWSING REPLY
THE NUMBER OF LISTS : 3
・FOLDER: NEWS AT NOON:　　　(http://homegw.ddns.xyz/mediaserver/contents/・・・・・)
・VIDEO: TODOROKI SOCCER FIELD　(http://homegw.ddns.xyz/mediaserver/contents/?contentsID=123)
・VIDEO: JAPANESE CHESS,　　(http://homegw.ddns.xyz/mediaserver/contents/・・)
　KING TITLE MATCH, THIRD TIME

45 DEVICE INFORMATION REGISTRATION REQUEST

DEVICE INFORMATION REGISTRATION
ACTION: DATA ACQUISITION
CONTENT: / mediaserver/contents/?contentsID=123
ACQUISITION DEVICE INFORMATION DEVICE NAME: FUJITSU MOVING IMAGE PLAYER
DEVICE TYPE: MOVING IMAGE PLAYER
MANUFACTURER: FUJITSU LIMITED
ID: 5aeb9621-ced0-692a-0bc4-15a15909a625
ACCESS URL: http://192.168.0.1/MPlayer/

41 ACQUISITION DEVICE INFORMATION

FIG. 13

46 ACCESS TICKET

TICKET DATA : 1646870373830134568130473094
EXPIRATION DATE : 2006/07/27 18:54:00

440 ISSUED TICKET MANAGEMENT TABLE

| DEVIDE ID | DEVICE TYPE | TICKET DATA | EXPIRATION DATE |
|---|---|---|---|
| 5aeb9621-ced0-692a-0bc4-15a15909a625 | MEDIA PLAYER | 16468670373830134568130473094 | 2006/07/27 18:54:00 |
| 69caa943d9c3-3210-7050-0024f2995c56 | MEDIA PLAYER | 120535668632663332059000098454 | 2006/07/27 1 4:23:00 |
| 567bdafc-c75d-3284-6b89-924f8e16c913 | MEDIA PLAYER | 1478778920023529207080409961004 | 2006/07/27 1 7:33:00 |
| | | | |

47 DATA ACQUISITION INSTRUCTION

ACTION: REPRODUCTION
CONTENT: http:// homegw.ddns.xyz/mediaserver/contents/?contentsID =123
ACCESS TICKET TICKET DATA : 164687037383013456813047 3094
EXPIRATION DATE : 2006/07/27 18:54:00

46 ACCESS TICKET

FIG. 16

48 DATA REQUEST

```
ACTION: ACQUISITION
CONTENT: http:// homegw.ddns.xyz/mediaserver/contents/?contentsID =123
TICKET DATA : 164687037383013456813047 3094
DEVICE ID : 5aeb9621-ced0-692a-0bc4-15a15909a625
```

FIG. 17

49 DATA REQUEST

ACTION : ACQUISITION
CONTENT : http:// homegw.ddns.xyz/mediaserver/contents/?contentsID =123

FIG. 18

53 DATA TRANSFER COMPLETION NOTICE

DATA TRANSFER COMPLETION
CONTENT : /mediaserver/contents/?contentsID=123
DATA URL: ftp://shared.server.ftp.xyz/pub/video/football.wmv

FIG. 26

54 DATA ACQUISITION INSTRUCTION

ACTION : REPRODUCTION
DATA URL : ftp:// shared.server.ftp.xyz/pub/video/football.wmv
ENCRYPTION KEY: VRwcAoJ3tPs58Obak2mCO2F8Pgih22aFztCIKUE5J

FIG. 27

COMPUTER-READABLE RECORDING MEDIUM RECORDING REMOTE CONTROL PROGRAM, PORTABLE TERMINAL DEVICE AND GATEWAY DEVICE

CROSS-REFERENCE TO RELATED APPLICATIONS

This application is based upon and claims the benefits of priority from the prior Japanese Patent Application No. 2006-291216, filed on Oct. 26, 2006, the entire contents of which are incorporated herein by reference.

BACKGROUND OF THE INVENTION

1. Field of the Invention

The present invention relates to a computer-readable recording medium which records a remote control program used for management of a protected network, to a portable terminal device and to a gateway device. More particularly, the present invention relates to a computer-readable recording medium which records a remote control program for acquiring data within a protected network by external operations. The present invention also relates to a portable terminal device and a gateway device.

2. Description of the Related Art

To devices connected to Internet from a network of houses or offices, direct connection from an external network is restricted for security reasons. This network protected from the outside is hereinafter referred to as a protected network. An access restriction described above is performed through an intermediate function referred to as a firewall or a gateway device (hereinafter, referred to as a gateway device including a firewall). The gateway device is generally set to permit only a minimal access request from the outside.

In reality, however, the following problem arises. Due to this connection restriction, even when a user as an original owner tries connection to the protected network from a device (within a local network different from the protected network) in a visiting place, this connection is restricted as that from the outside. Therefore, the gateway device may be set to allow a user to connect to a device within the protected network also from the outside. The simplest device connection method which can be used is a method for performing a gateway setting such as port mapping setting and for publishing a specific internal device to the outside. However, when this setting is performed, a protection function of the gateway device does not operate at all for the access to the published device. Therefore, the published device is always exposed to devices in the world and as a result, is in danger of being attacked by a malicious third party.

Meanwhile, a portable terminal device carried by a user can be treated as a reliable device previously authenticated by a gateway, in which a secure path can be set using a device authentication function and a communication encryption function such as VPN (Virtual Private Network) function. In a conventional example, there is used a method of using such a secure path to perform communication between internal network devices and peripheral local network devices.

There is disclosed a technology in which when a content published on the Internet by a file server is required, a proxy acquisition server is allowed to acquire the content by the control from a mobile phone (see, e.g., Japanese Unexamined Patent Publication No. 2002-32286).

However, the technology disclosed in Japanese Patent Application Publication Unexamined No. 2002-32286 assumes that the proxy acquisition server can access to the file server. Therefore, this technology cannot be applied to the case where the file server is placed within a LAN protected by a gateway device.

Accordingly, there is considered a method of acquiring a content using a mobile phone connected through the VPN to a LAN at home and transferring the content to a network device in a visiting place. However, the method of thus mediating data communication using a portable terminal device has the following problems.

The first problem is as follows. The portable terminal device must be reduced in weight to allow a user to carry the device. Therefore, the terminal device is limited in its battery capacity as well as limited in its driving time. Further, the portable terminal device increases in its power consumption according to increase in its work rate and data communication amount. Therefore, the terminal device has difficulty in mediating data communication for many hours.

The second problem is as follows. A CPU of the portable terminal device also has problems of weight and power consumption. Due to these problems, a CPU having a relatively low processing speed is frequently used. Due to this low calculating ability, the portable terminal device is also lowered in its data communication speed.

It is basically possible for a user to allow only a network device in a visiting place to perform direct communication with a network device at home. However, a user must considerably change the setting of the gateway device from the outside. Accordingly, it is impractical in terms of trouble for the user to check information of local network devices and to perform change operations in each case.

SUMMARY OF THE INVENTION

In view of the foregoing, it is an object of the present invention to provide a computer-readable recording medium which records a remote control program for allowing data on a network protected by a gateway device to be transferred to an external device by external remote-control operations, to provide a portable terminal device and to provide a gateway device.

To accomplish the above objects, according to one aspect of the present invention, there is provided a computer-readable recording medium which records a remote control program for acquiring data within a protected network by external operations. This remote control program causes a portable terminal device to serve as: (a) a device information acquiring unit which acquires, from a device within a local network connected through a communication interface, device identification information for identifying the device; (b) a device information storing unit which stores the device identification information acquired by the device information acquiring unit; (c) a data acquisition device designation receiving unit which receives an operation input for designating, from among the device identification information stored in the device information storing unit, the device identification information of a data acquisition device to execute a data acquisition processing; (d) a data list storing unit which stores data identification information for identifying data stored in a data server device within the protected network connected to a local network through another network; (e) a transfer data designation receiving unit which receives an operation input for designating the data identification information on data as a transfer object from among the data identification information stored in the data list storing unit; (f) an access ticket issue requesting unit which transmits an access ticket issue request to a gateway device installed between the protected network and another network, the access ticket issue request being a request for requesting the gateway device to issue an access ticket indicating that external access to the protected network is permitted; and (g) a data acquisition instructing unit which, when an access ticket including key information for accessing the protected network is transmitted from the gateway device in response to the access ticket issue request, transmits to the data acquisition device a data acquisition instruction including the access ticket and the data identification information of the data designated as a transfer object.

According another aspect of the present invention, there is provided a portable terminal device for remotely controlling a device connected through a network. This portable terminal device comprises: (a) a device information acquiring unit which acquires, from a device within a local network connected through a communication interface, device identification information for identifying the device; (b) a device information storing unit which stores the device identification information acquired by the device information acquiring unit; (c) a data acquisition device designation receiving unit which receives an operation input for designating, from among the device identification information stored in the device information storing unit, the device identification information of a data acquisition device to execute a data acquisition processing; (d) a data list storing unit which stores data identification information for identifying data stored in a data server device within a protected network connected to the local network through another network; (e) a transfer data designation receiving unit which receives an operation input for designating the data identification information on data as a transfer object from among the data identification information stored in the data list storing unit; (f) an access ticket issue requesting unit which transmits an access ticket issue request to a gateway device installed between the protected network and another network, the access ticket issue request being a request for requesting the gateway device to issue an access ticket indicating that external access to the protected network is permitted; and (g) a data acquisition instructing unit which, when an access ticket including key information for accessing the protected network is transmitted from the gateway device in response to the access ticket issue request, transmits to the data acquisition device a data acquisition instruction including the access ticket and the data identification information of the data designated as a transfer object.

According to yet another aspect of the present invention, there is provided a gateway device installed between a protected network and another network to restrict external access to the protected network. This gateway device comprises: (a) an access ticket issue request receiving unit which receives an access ticket issue request from a portable terminal device connected through another network, the access ticket issue request being a request for requesting the gateway device to issue an access ticket indicating that external access to the protected network is permitted; (b) an access ticket issuing unit which generates key information in response to the access ticket issue request and transmits to the terminal device an access ticket including the key information; (c) a key information storing unit which stores the key information transmitted to the terminal device; and (d) an access controlling unit which, when receiving a data request to a data server device within the protected network from the data acquisition device connected through another network, determines whether key information included in the data request agrees with the key information within the key information storing unit and which, when both information units agree with each other, transfers the data request to the data server device.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 shows a data structure example of a data list request.
FIG. 10 shows a data structure example of a data list.
FIG. 13 shows a data structure example of a device information registration request.
FIG. 14 shows a data structure example of an access ticket.
FIG. 15 shows a data structure example of an issued ticket management table.
FIG. 16 shows a data structure example of a data acquisition instruction.
FIG. 17 shows a data structure example of a data request.
FIG. 18 shows a data structure example of a data request output from a gateway device.
FIG. 26 shows a data structure example of a data transfer completion notice.
FIG. 27 shows a data structure example of a data acquisition instruction.

DESCRIPTION OF THE PREFERRED EMBODIMENTS

Figure 1:
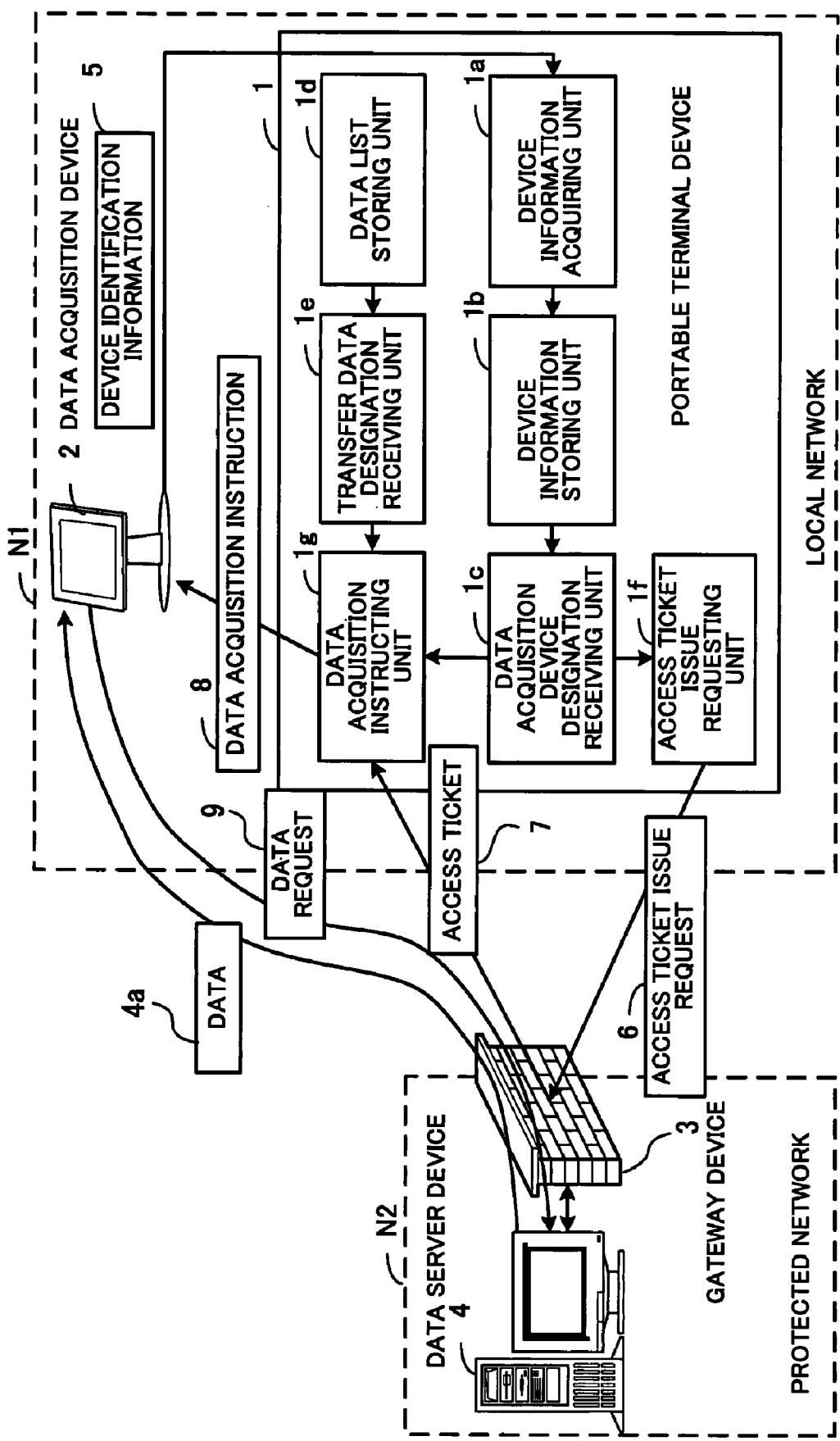
FIG. 1 shows an outline of the present invention.

Preferred embodiments of the present invention will be described below with reference to the accompanying drawings, wherein like reference numerals refer to like elements throughout.

FIG. 1 shows an outline of the present invention. A portable terminal device 1 is connected to a local network N1. To the local network N1, a data acquisition device 2 is also connected. The local network N1 is connected to a protected network N2 through another network (not shown). To the protected network N2, external access is restricted by a gateway device 3. Further, a data server device 4 for providing data 4a in response to a data request 9 is connected to the protected network N2.

The portable terminal device 1 remotely controls the data acquisition device 2 and the gateway device 3 to thereby allow the data acquisition device 2 to acquire the data 4a within the data server device 4. For this purpose, the portable terminal device 1 has a device information acquiring unit 1a, a device information storing unit 1b, a data acquisition device designation receiving unit 1c, a data list storing unit 1d, a transfer data designation receiving unit 1e, a data acquisition instructing unit 1g and an access ticket issue requesting unit 1f.

The device information acquiring unit 1a acquires, from a device within the local network N1 connected through a communication interface, device identification information 5 for identifying the device. The device identification information 5 includes, for example, an identification code which is set in the manufacture of the data acquisition device 2. As well as the device identification information 5, the unit 1a may acquire from the device 2 the information including a device name and a device function type.

The device information storing unit 1b stores the device identification information 5 acquired by the device information acquiring unit 1a. When plural devices are connected to the local network N1, the device identification information 5 corresponding to each device is stored.

The data acquisition device designation receiving unit 1c receives an operation input for designating, from among the device identification information stored in the device information storing unit 1b, the device identification information of a data acquisition device 2 to execute a data acquisition processing. For example, the unit 1c displays a list of device names corresponding to the device identification information 5 and receives an operation input for selecting from the list a device used as the data acquisition device 2.

The data list storing unit 1d stores data identification information for identifying data stored in the data server device 4 within the protected network N2 connected to the local network N1 through another network. When the gateway device 3 is set to permit external access by the device 1, the device 1 can access the device 4 and acquire a data list provided by the device 4. In this case, the data identification information indicated in the list acquired from the device 4 is stored in the data list storing unit 1d.

The transfer data designation receiving unit 1e receives an operation input for designating the data identification information on data as a transfer object from among the data identification information stored in the data list storing unit 1d. For example, the unit 1e displays a list of data names corresponding to the data identification information and receives an operation input for selecting from the list the data as a transfer object.

The access ticket issue requesting unit if transmits an access ticket issue request 6 to the gateway device 3 installed between the protected network N2 and another network. The request 6 is a request for requesting the gateway device 3 to issue an access ticket 7. The access ticket 7 is information indicating that external access to the protected network N2 is permitted. The unit if may include the device identification information of the data acquisition device 2 in the access ticket issue request 6.

The data acquisition instructing unit 1g acquires the access ticket 7 transmitted from the gateway device 3 in response to the access ticket issue request 6. This access ticket 7 includes key information for accessing the protected network N2. Then, the unit 1g transmits to the data acquisition device 2 a data acquisition instruction 8 including the access ticket 7 and the data identification information of the data 4a designated as a transfer object.

The data acquisition device 2 returns the device identification information 5 in response to the request from the portable terminal device 1. The device 2, when receiving the data acquisition instruction 8, transmits to the gateway device 3 the data request 9 for acquiring the data 4a designated by the instruction 8. The device 2 includes key information in the transmit data request 9.

The gateway device 3, when receiving the access ticket issue request 6 from the portable terminal device 1, generates the key information. Then, the device 3 transmits to the device 1 the access ticket 7 including the key information. The key information transmitted to the device 1 is stored in the device 3. Then, the device 3, when receiving the data request 9 from the data acquisition device 2, determines whether the key information included in the data request 9 agrees with the previously stored key information. Further, the device 3, only when both information units agree with each other, transfers the data request 9 to the data server device 4.

The gateway device 3, when the device identification information for identifying the data acquisition device 2 is included in the access ticket issue request 6, stores the key information in association with the device identification information. Then, the device 3, when receiving the data request 9 from the device 2, determines whether a combination of the device identification information and key information included in the data request 9 agrees with a combination of the device identification information and key information previously stored in the key information storing means. Further, the device 3, only when both combinations agree with each other, transfers the data request 9 to the device 4.

According to the above-described system, the portable terminal device 1 transmits to the gateway device 3 an access ticket issue request 6. The gateway device 3 generates key information and transmits to the terminal device 1 an access ticket 7 including the key information. The terminal device 1 transfers to the data acquisition device 2 the data acquisition instruction 8 including the acquired access ticket 7. The device 2 transmits to the gateway device 3 the data request 9 including the key information. When the key information added to the access ticket 7 and the key information included in the data request 9 are the same, the gateway device 3 transfers the data request 9 to the data server device 4. The device 4 transfers the data 4a to the data acquisition device 2.

Thus, the access ticket 7 that indicates permission of external access to the protected network N2 is automatically acquired and therefore, a user's trouble can be saved. When the portable terminal device 1 is connected to the gateway device 3 through a secure communication path (e.g., VPN), important data such as the access ticket 7 can be exchanged through the secure communication path. Further, the data transfer is directly performed between devices and therefore, it is possible to perform the data transfer without depending on the capacity of the device 1.

Next, the present embodiment will be described in detail;.

First Embodiment

Figure 2:
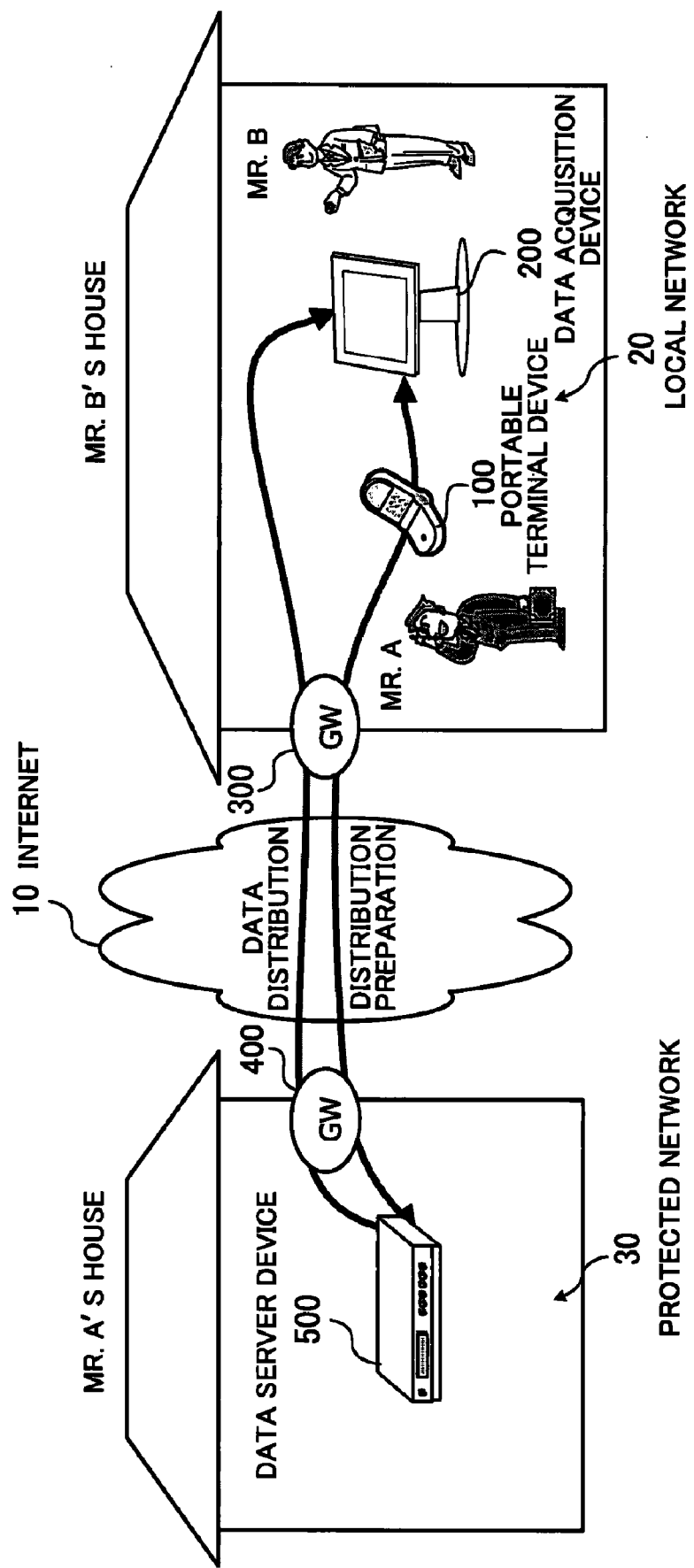
FIG. 2 shows a system configuration example of a first embodiment according to the present invention.

FIG. 2 shows a system configuration example of a first embodiment according to the present invention. The first embodiment assumes that Mr. A visits Mr. B and transfers a content to Mr. B. A wireless LAN is provided in Mr. B's house. To the wireless LAN, a data acquisition device 200 is connected. The device 200 is, for example, a display unit connectable to a network. The device 200 has a function of receiving instructions from a portable terminal device 100 and acquiring data from a data server device 500. The wireless LAN in Mr. B's house is connected to Internet 10 through a gateway device (GW) 300. Hereinafter, a network in Mr. B's house is referred to as a local network 20.

Similarly to a normal gateway device, the gateway device 300 which protects the local network 20 passes only a communication request from the inside to the outside and rejects a communication request from the outside.

The data server device 500 is provided in Mr. A's house. The device 500 publishes data using a predetermined protocol such as HTTP (HyperText Transfer Protocol) and FTP (File Transfer Protocol). The device 500 is connected to a home wireless LAN. The wireless LAN in Mr. A's house is connected to the Internet 10 through a gateway device (GW) 400. Hereinafter, the network in Mr. A's house is referred to as a protected network 30.

The gateway device 400 which protects the protected network 30 has an ordinary gateway function as well as a function of permitting a communication to an internal device from an external device having a predetermined access ticket. Further, the device 400 has a function of receiving a communication device additional application from a reliable device and issuing a new access ticket.

Mr. A has a portable terminal device 100. The device 100 has a battery power, and is freely portable. Further, the device 100 has a VPN function. Using this VPN function, the device 100 can perform a VPN communication with the gateway device 400 and connect to the protected network 30 in Mr. A's house through the Internet 10.

Further, the portable terminal device 100 can connect to the local network 20 in Mr. B's house, using a wireless LAN communication function. The device 100 has a function of detecting a device within the connected wireless LAN. Such a device detection function includes, for example, a UPnP (Universal Plug&Play)-compatible protocol. Further, the device 100 has a function of performing an application for allowing the detected device to communicate with the gateway device 400 installed in Mr. A's house and of acquiring a new access ticket through the detected device. The device 100 may transmit the access ticket to a neighboring device and instruct the device to acquire the predetermined data.

Here, Mr. A visits Mr. B's house with the portable terminal device 100. Then, Mr. A first connects the device 100 to the local network 20. Further, Mr. A operates the device 100 to connect the device 100 to the protected network 30 using the VPN function. Then, based on the operation input to the device 100 by Mr. A, the device 100 makes the preparation for distributing the data within the data server device 500 to the data acquisition device 200. Thereafter, the device 200 accesses the data server device 500 through the gateway devices 300 and 400, and acquires the data from the device 500.

In the present embodiment, access is performed from the local network 20 inside to the protected network 30 and only a response to the access is returned from the network 30 to the network 20. Therefore, there occurs no communication that is restricted by the gateway device 300 of the network 20. Accordingly, description on the operations of the device 300 will be omitted below except when the description is particularly required.

Figure 3:
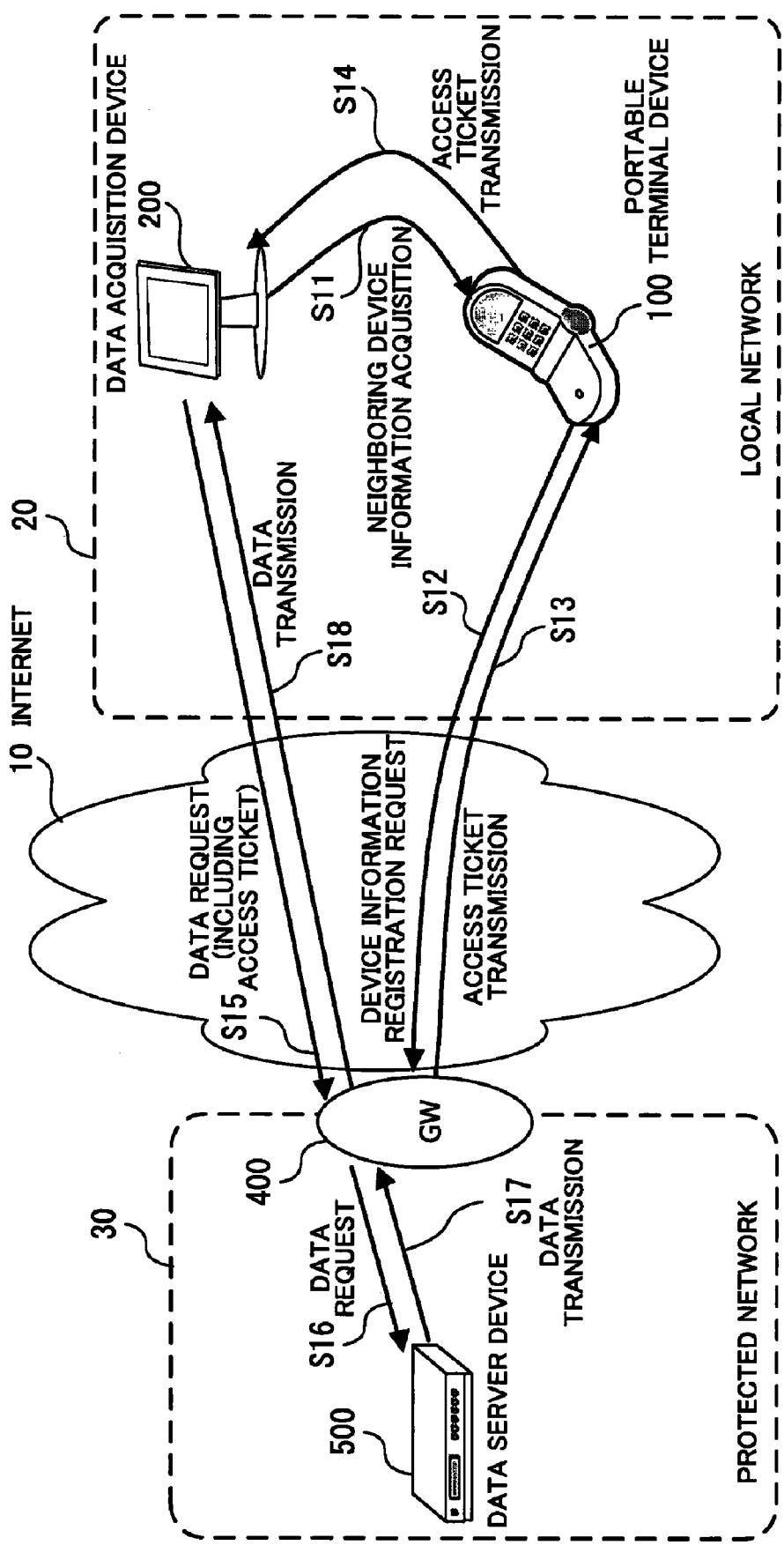
FIG. 3 shows an outline of operations up to data acquisition in the system of the first embodiment.

FIG. 3 shows an outline of operations up to the data acquisition in the system according to the first embodiment. The portable terminal device 100 acquires neighboring (within the local network 20) device information from a device connected to the local network 20 (step S11). The device 100 can perform this operation using a protocol such as UPnP. Thus, the device information of the data acquisition device 200 is transferred to the device 100.

Next, the portable terminal device 100 requests the gateway device 400 of the protected network 30 to register device information of the data acquisition apparatus 200 (step S12). The device 400 registers the device information of the device 200 as well as transmits an access ticket to the device 100 (step S13). The access ticket is management information indicating that external data access through the device 400 is permitted with restrictions. In the access ticket, there is defined the restricted contents such as a temporal restriction (by the end of the day) and a restriction on the number of accesses (only one access is permitted).

The access ticket is transferred to the portable terminal device 100. The device 100 transmits the received access ticket to the data acquisition device 200 (step S14). Then, the device 200 transmits to the gateway device 400 a data acquisition request including the access ticket (step S15). The device 400 checks that the received access ticket is correct. When the access ticket is correct, the device 400 transfers the data acquisition request to the data server device 500 (step S16). The device 500 transmits to the device 400 the appropriate data in response to the data acquisition request (step S17). The device 400 transfers to the device 200 the data transmitted from the device 500 (step S18). The device 200 stores the acquired data and displays the data on the screen.

The hardware configuration of the respective devices required to realize operations as shown in FIG. 3 will be described below.

Figure 4:
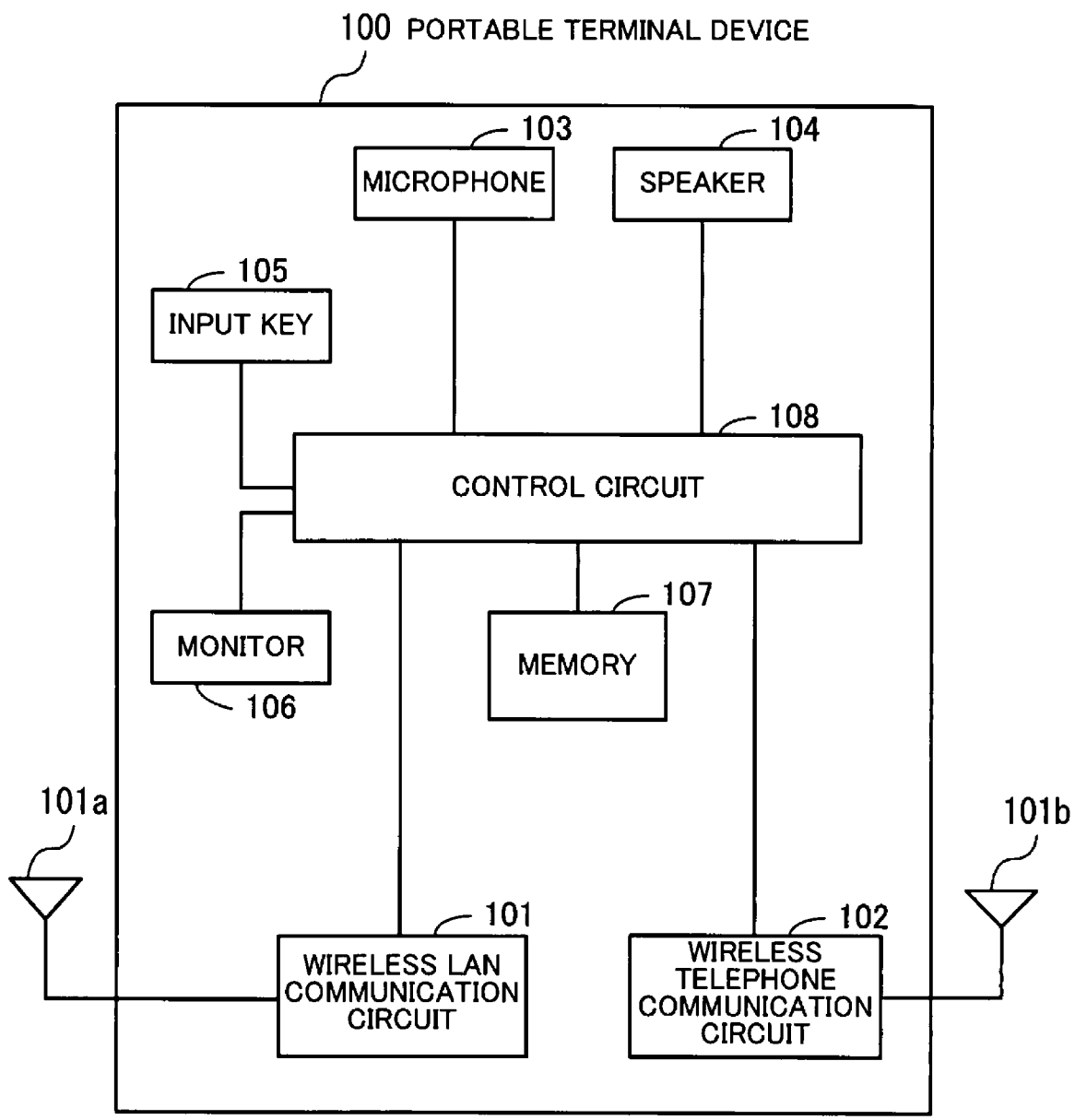
FIG. 4 shows a hardware configuration of a portable terminal device.

FIG. 4 shows a hardware configuration of the portable terminal device. The whole portable terminal device 100 is controlled by a control circuit 108. To the control circuit 108, a wireless LAN communication circuit 101, wireless telephone communication circuit 102, microphone 103, speaker 104, input key 105, monitor 106 and memory 107 are connected.

The wireless LAN communication circuit 101 performs wireless data communication with a wireless LAN access point through an antenna 101*a*. The wireless telephone communication circuit 102 performs wireless data communication with a base station of a mobile phone network through an antenna 101*b*.

The microphone 103 transfers to the control circuit 108 a voice input from a user. The speaker 104 outputs a voice based on voice data output from the circuit 108.

The input key 105 includes plural keys such as a numeric keypad and transfers to the control circuit 108 a signal in response to a key pressed by a user. The monitor 106 is, for example, a liquid crystal display and displays image data transmitted from the circuit 108.

The memory 107 stores a program descriptive of processing contents executed by the circuit 108, and data necessary for the processings.

Next, functions realized in the portable terminal device 100 with the above-described hardware configuration will be described.

Figure 5:
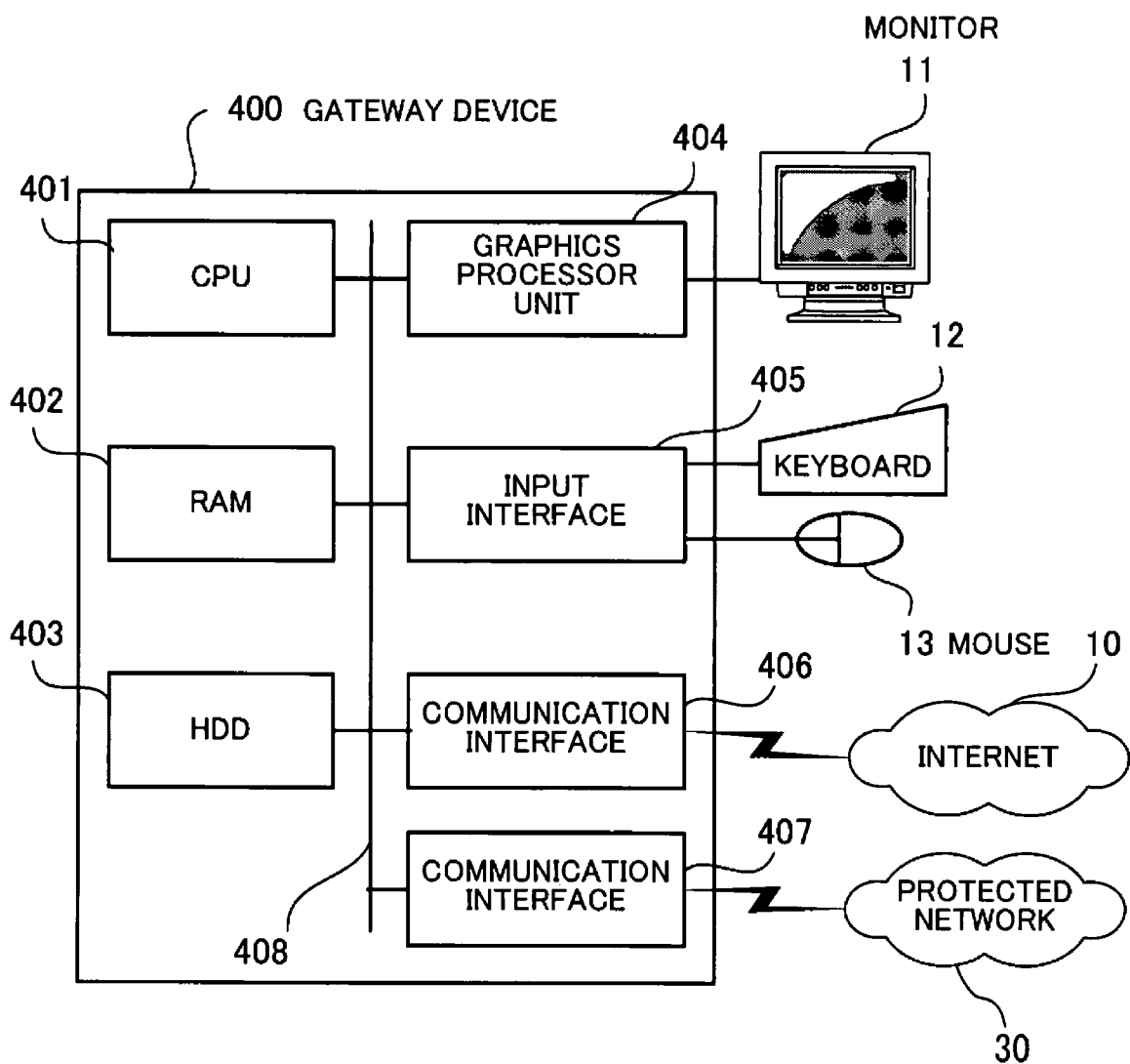
FIG. 5 shows a hardware configuration example of a gateway device used in the present embodiment.

FIG. 5 shows a hardware configuration example of the gateway device used in the present embodiment. The whole gateway device 400 is controlled by a CPU (Central Processing Unit) 401. To the CPU 401, a RAM (Random Access Memory) 402, HDD (Hard Disk Drive) 403, graphics processor unit 404, input interface 405, and communication interfaces 406 and 407 are connected through a bus 408.

The RAM 402 temporarily stores at least a part of an OS (Operating System) program and application program executed by the CPU 401. Further, the RAM 402 stores various data necessary for processings by the CPU 401. The HDD 403 stores the OS and application programs. In place of the HDD 403, a nonvolatile semiconductor memory device such as a flash memory can also be used.

To the graphics processor unit 404, a monitor 11 is connected. The unit 404 displays images on the screen of the monitor 11 according to instructions from the CPU 401. To the input interface 405, a key board 12 and a mouse 13 are connected. The input interface 405 transmits signals from the key board 12 and the mouse 13 to the CPU 401 through the bus 408.

The communication interface 406 is connected to an Internet 10. The interface 406 transmits and receives data to and from the portable terminal device 100 or the data acquisition device 200 through the Internet 10.

The communication interface 407 is connected to the protected network 30. The interface 407 transmits and receives data to and from the data server device 500 through the protected network 30.

The processing functions of the present embodiment can be realized by the above-described hardware configuration. FIG. 5 shows the hardware configuration of the gateway device 400. Further, the processing functions of the data acquisition device 200, the gateway device 300 and the data server device 500 can also be realized by the same hardware configuration as that of the gateway device 400. Note, however, that the apparatus 200 and the device 500 each may have one communication interface.

Next, the functions for realizing the processings according to the present embodiment will be described.

Figure 6:
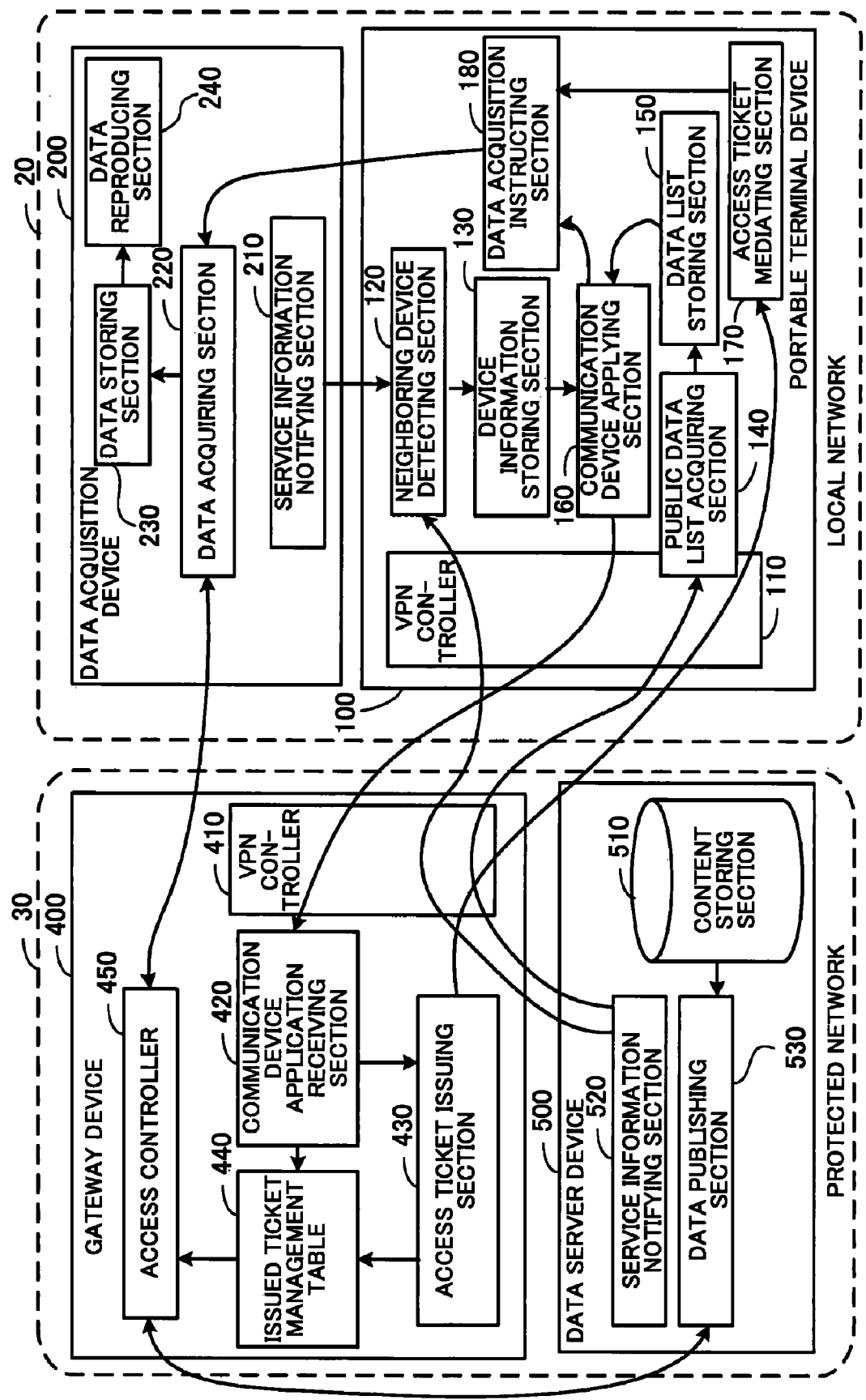
FIG. 6 is a block diagram showing the functions of the respective devices in the first embodiment.

FIG. 6 is a block diagram showing the functions of the respective devices in the first embodiment. The portable terminal device 100 has a VPN controller 110, a neighboring device detecting section 120, a device information storing section 130, a public data list acquiring section 140, a data list storing section 150, a communication device applying section 160, an access ticket mediating section 170 and a data acquisition instructing section 180.

The VPN controller 110 connects to the gateway device 400 of the protected network 30 by the VPN function. The controller 110, when communicating with the device 400, encrypts a communication packet. Then, the controller 110 adds new header information to the encrypted data and transmits the data to the device 400 through the Internet 10. Further, the controller 110, when receiving a packet from the device 400, decrypts data within the packet. Since the decrypted data includes also header information of the packet before encryption, the controller 110 transfers the decrypted data to a predetermined function based on the header information.

The neighboring device detecting section 120, after the portable terminal device 100 is connected to the protected network 30 by the VPN controller 110, detects devices connected to the protected network 30 and the local network 20. For example, the section 120 transmits a device information notification request by broadcasting to the networks 30 and 20 according to a predetermined protocol. Then, device information is returned from a device with a protocol corresponding to the device information notification request. The section 120 stores the returned device information in the device information storing section 130.

The device information storing section 130 is a storage device for storing device information. For example, a part of storage area of the memory 107 is used as the device information storing section 130.

The public data list acquiring section 140, after being connected to the protected network 30 by the VPN function, accesses the data server device 500 and acquires a list of data being published. Further, the section 140 stores the acquired data list in the data list storing section 150.

The data list storing section 150 is a storage device for storing a data list. For example, a part of storage area of the memory 107 is used as the data list storing section 150.

The communication device applying section 160 selects, in response to an operation input from a user (e.g., Mr. A), a communication device permitted to connect to the protected network 30. Further, from among the data published by the data server device 500, the section 160 selects, in response to the operation input from a user (e.g., Mr. A), data to be published to a communication device outside the network 30. Then, the section 160 transmits to the gateway device 400 a communication device registration request for the publication of the selected data to the selected communication device.

The access ticket mediating section 170, when receiving an access ticket from the gateway device 400, transfers the access ticket to the data acquisition instructing section 180.

The data acquisition instructing section 180, when receiving the access ticket, transmits the data acquisition instruction to the communication device (in this example, assume that the data acquisition device 200 is selected) selected by the communication device applying section 160.

The data acquisition device 200 has a service information notifying section 210, a data acquiring section 220, a data storing section 230 and a data reproducing section 240.

The service information notifying section 210 transmits device information of the data acquisition device 200 in response to the device information notification request. The device information includes, for example, an ID for uniquely identifying the data acquisition device 200 and information on the function of the device 200.

The data acquiring section 220, when receiving the data acquisition instruction, acquires the designated data. Then, the section 220 stores the acquired data in the data storing section 230.

The data storing section 230 is a storage device for storing data acquired by the data acquiring section 220. For example, a part of storage area of a hard disc device housed in the data acquisition device 200 is used as the data storing section 230.

The data reproducing section 240 reproduces the data stored in the data storing section 230. For example, when video data is stored in the data storing section 230, the section 240 reproduces the video data and displays the video on the screen.

The gateway device 400 has a VPN controller 410, a communication device application receiving section 420, an access ticket issuing section 430, an issued ticket management table 440 and an access controller 450.

The VPN controller 410 performs the VPN connection with the portable terminal device 100 through the Internet 10. On this occasion, the controller 410 authenticates the portable terminal device 100 and checks that the device 100 belongs to Mr. A. The controller 410 authenticates the device 100, for example, by checking that the previously registered ID of the device 100 agrees with the ID transmitted from the device 100 in the VPN connection. Further, the controller 410, when transmitting data to the device 100 connected via VPN, encrypts a packet for transmission and adds thereto header information for the Internet 10 transmission. Further, the controller 410, when receiving the packet from the device 100, decrypts the data of the packet. Then, the controller 410 performs processings such as a data transfer based on the header information contained in the decrypted data.

The communication device application receiving section 420 receives a communication device registration request transmitted from the portable terminal device 100. Then, the section 420 transfers the received communication device registration request to the access ticket issuing section 430.

The access ticket issuing section 430, when receiving the communication device registration request, issues an access ticket in response to the registration request. Then, the section 430 registers the issued access ticket in the issued ticket management table 440 and at the same time, transmits the access ticket to the device 100 as a transmission source of the communication device registration request.

The issued ticket management table 440 is a storage device for storing an access ticket issued by the access ticket issuing section 430. For example, a part of the storage area within the RAM 102 is used as the table 440.

The access controller 450, when receiving a data request from the data acquisition device 200, compares an access ticket included in the data request and an access ticket stored in the issued ticket management table 440. Then, the controller 450, when the appropriate access ticket exists in the table 440 and satisfies use conditions such as an expiration date, acquires from the data server device 500 the data designated by the data request.

The data server device 500 has a content storing section 510, a service information notifying section 520 and a data publishing section 530.

The content storing section 510 is a storage device for storing data for publication. For example, a part of the storage area within a hard disc device provided in the data server device 500 is used as the content storing section 510.

The service information notifying section 520 transmits device information of the data server device 500 in response to the device information notification request. The device information includes, for example, an ID for uniquely identifying the data server device 500 and information on the function of the device 500.

The data publishing section 530 acquires the requested data from the content storing section 510 in response to the data request from the gateway device 400. Then, the section 530 transmits the acquired data to the device 400.

Next, there will be concretely described a procedure in which Mr. A transfers data stored in his house to the data acquisition device 200 in Mr. B's house and then reproduces the data.

Figure 7:
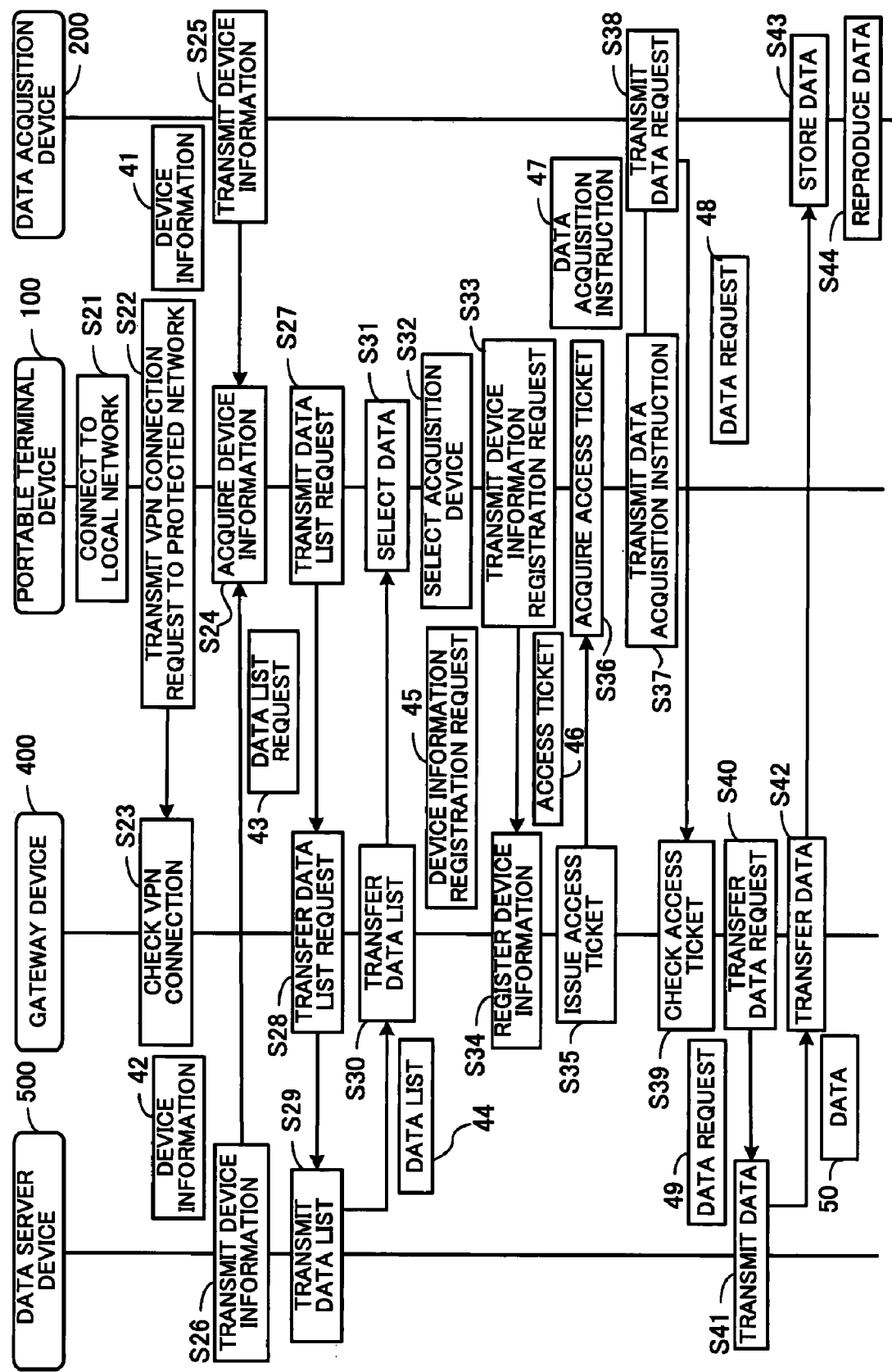
FIG. 7 is a sequence diagram showing a procedure of a data acquisition processing in the first embodiment.

FIG. 7 is a sequence diagram showing a procedure of a data acquisition processing in the first embodiment. The processings shown in FIG. 7 will be described below according to the step numbers.

[Step S21] The portable terminal device 100, when detecting a signal output from an access point (not shown) of the wireless LAN in Mr. B's house, connects to the local network 20 through the appropriate access point. On this occasion, when the access point requests the input of a keyword, Mr. B operates a mobile-phone and inputs the keyword. This processing is realized by controlling, using a device driver, the wireless LAN communication circuit 101 of the portable terminal device 100. Thus, the device 100 serves as one of devices connected to the local network 20.

[Step S22] The VPN controller 110 of the portable terminal device 100 accesses the gateway device 400 of the protected network 30 and transmits a VPN connection request to the gateway device 400 in response to the operation input from a user (e.g., Mr. A). The access from the device 100 to the device 400 is performed through the local network 20, the gateway device 300 and the Internet 10.

[Step S23] The VPN controller 410 of the gateway device 400 creates a VPN communication environment in response to the VPN connection request from the portable terminal device 100 and checks the VPN connection. Thus, the portable terminal device 100 serves as one of devices connected to the protected network 30. In other words, the device 100 serves as a communication device connected to both of the local network 20 and the protected network 30.

[Step S24] The portable terminal device 100 acquires device information from devices connected to the networks 20 and 30. Specifically, the neighboring device detecting section 120 of the device 100 transmits the device information notification request to each of the networks 20 and 30.

[Step S25] The service information notifying section 210 of the data acquisition device 200 transmits device information 41 to the portable terminal device 100.

[Step S26] The service information notifying section 520 of the data server device 500 transmits device information 42 to the portable terminal device 100.

Figure 8:
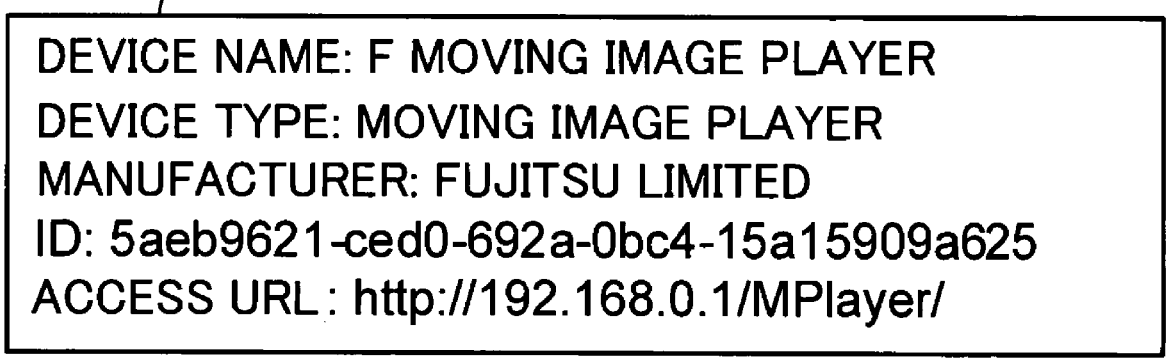
FIG. 8 shows a data structure example of device information.

FIG. 8 shows a data structure example of the device information. In the device information 41, information is set in association with the items of a device name, device type, manufacturer, ID and access URL (Uniform Resource Locator).

In the item of the device name, a name of the device from which the device information 41 is transmitted is set. In the item of the device type, a function of the device from which the device information 41 is transmitted is shown. In the example of FIG. 8, information "video player" indicating a reproduction function of a video file is set as the device type. In the item of the manufacturer, a name of the manufacturer of the device from which the device information 41 is transmitted is set. In the item of the ID, identification information for uniquely identifying the device from which the device information 41 is transmitted is set. In the item of the access URL, a file URL for executing a function indicated by the device type is set.

The device information 41 and 42 acquired from the data acquisition device 200 and the data server device 500 is stored in the device information storing section 130.

Turning now to FIG. 7, a processing after acquisition of the device information 41 and 42 will be described.

[Step S27] The public data list acquiring section 140 of the portable terminal device 100 transmits a data list request 43 to the data server device 500.

FIG. 9 shows a data structure example of the data list request. In the data list request 43, information is set indicating that this request is a data list browsing request. Further, the data list request 43 includes, as a parameter in command execution, information on the items of path and list upper limit. In the item of the path, information for uniquely identifying a folder in which data as a browsing object is stored is set. A value of the path is previously set, for example, in a memory area managed by the public data list acquiring section 140. Further, the path may be designated by the operation input in the transmission of the data list request 43. In the item of the list upper limit, the upper limit of the number of data names included in the acquisition list is set. A value of the list upper limit is previously set, for example, in a storage area managed by the public data list acquiring section 140. Further, the list upper limit may be designated by the operation input in the transmission of the data list request 43.

A path shown in FIG. 9 is a relative path which, when a file of the data list is previously created in the data server device 500, describes a path from a reference folder to the destination file. In the case of acquiring a file list within an arbitrary folder, an absolute path (e.g., http://homegw.ddns.xyz/mediaserver/contents/) of the appropriate folder may be designated.

Turning now to FIG. 7, a processing after transmission of the data list request 43 will be described.

[Step S28] The gateway device 400 transfers the data list request 43 to the data server device 500.

[Step S29] The device 500, when receiving the data list request 43, transmits to the device 400 a data list 44 (a list of data names within the number designated by the list upper limit) within the folder designated by the path.

[Step S30] The gateway device 400 transfers the data list 44 to the portable terminal device 100.

FIG. 10 shows a data structure example of the data list. In the data list 44, information is set indicating that this information is a response to the data list browsing request. Further, the data list 44 has an item of the number of lists. In the item of the number of lists, the number of data names included in the data list 44 is set. Further, data names in the number corresponding to the number of lists are set in the data list 44. To each of the data names, a URL for accessing the appropriate data is applied. A folder name is also included in the list.

Turning now to FIG. 7, a processing after response of the data list 44 will be described.

[Step S31] The public data list acquiring section 140 of the portable terminal device 100 stores the acquired data list 44 in the data list storing section 150. Then, the communication device applying section 160 selects data for acquisition from among the data list 44 stored in the section 150. Specifically, the section 160 displays contents of the data list 44 on the monitor 106 of the device 100 and receives an operation input for designating the data for acquisition. When a user (e.g., Mr. A) designates data, the section 160 selects the designated data as the data for acquisition.

Figure 11:
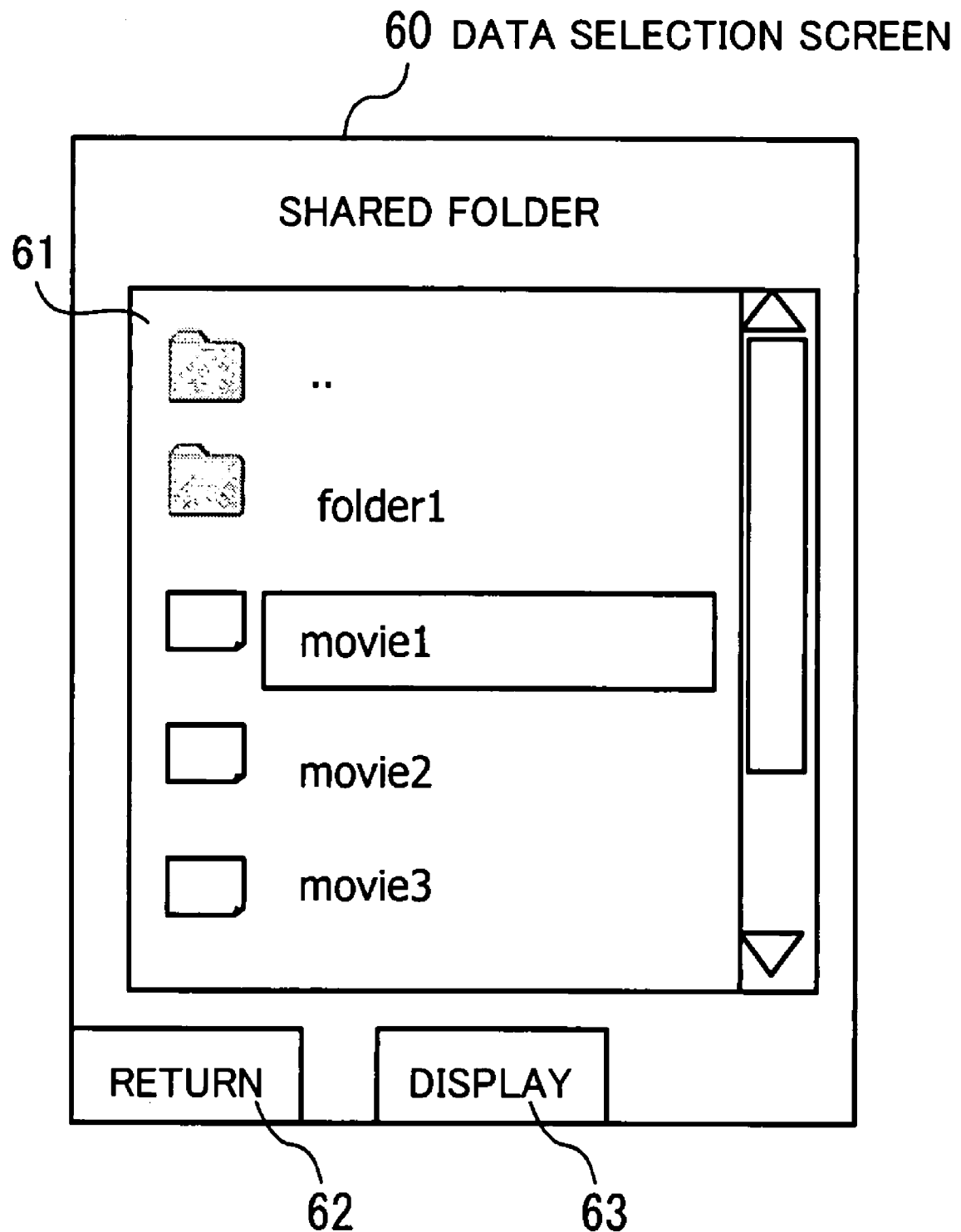
FIG. 11 shows an example of a data selection screen.

FIG. 11 shows an example of a data selection screen. The data selection screen 60 has a list display section 61. In the list display section 61, folder names and data names shown in the data list 44 are displayed. A user can designate an arbitrary data name by operating input keys of the device 100.

A return button 62 and a display button 63 are provided at the bottom of the list display section 61. The return button 62 is a button for displaying a screen displayed previous to the data selection screen 60. The display button 63 is a button for displaying, when a folder is selected, a content of the folder. When a folder is selected in the list display section 61 and the display button 63 is pressed, the data list request 43 that designates the location of the selected folder is transmitted to the data server device 500. Then, the content of the data list 44 returned from the device 500 in response to the data list request 43 is displayed on the screen.

Turning now to FIG. 7, a processing after the data selection will be described.

[Step S32] The communication device applying section 160 selects, from among device information stored in the device information storing section 130, a device to execute data acquisition. Specifically, the section 160 displays a content of the device information on the monitor 106 of the device 100 and receives an operation input for designating a device to execute the data acquisition. When a user (e.g., Mr. A) designates the device, the section 160 selects the designated device as a device to execute the data acquisition.

Figure 12:
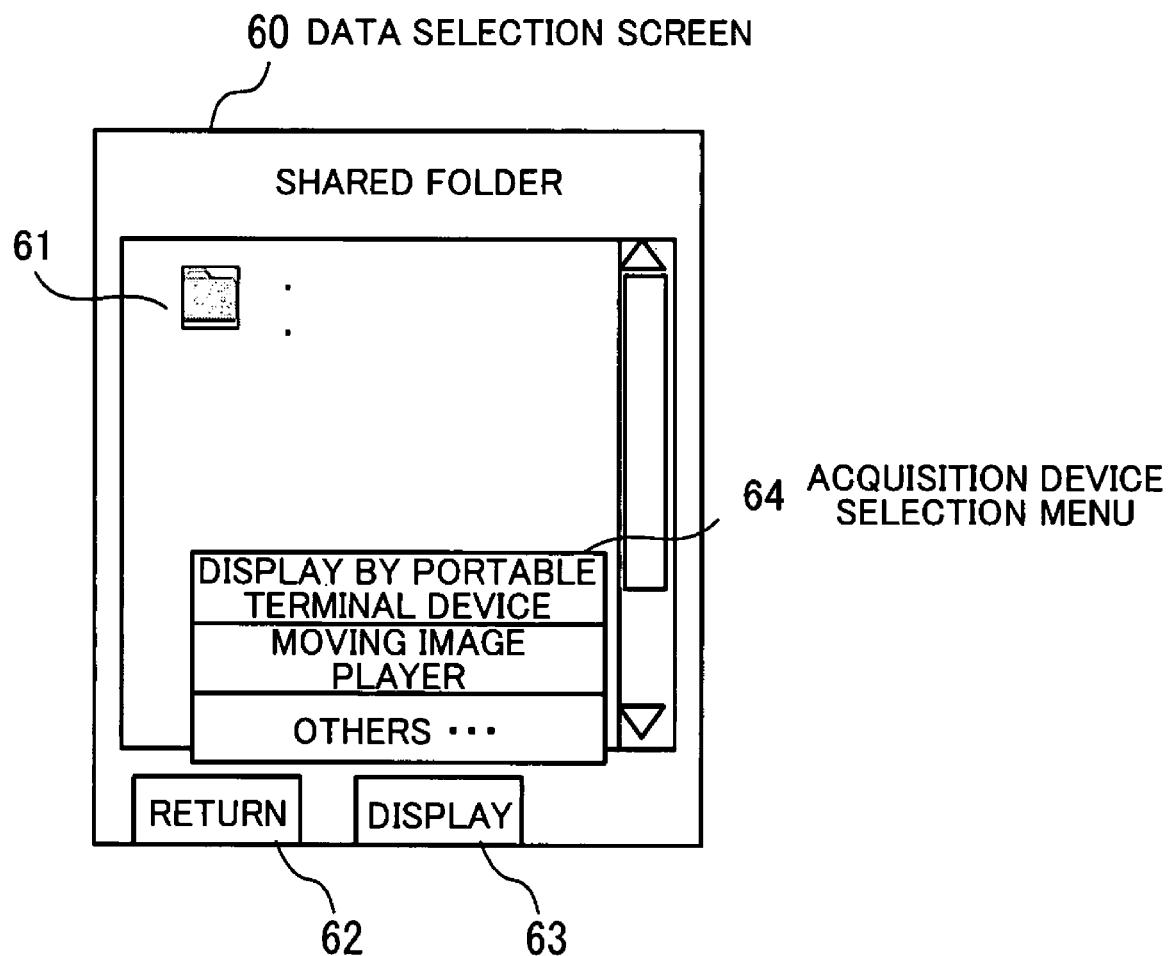
FIG. 12 shows a display example of a device selection menu.

FIG. 12 shows a display example of a device selection menu. In this example, when a predetermined key is operated during the display of the data selection screen 60, the acquisition device selection menu 64 is displayed. On the menu 64, a list of the device names indicated in the device information stored in the device information storing section 130 is displayed. When a user performs an operation input for designating one of the displayed device names, the communication device applying section 160 selects the designated device as an acquisition device.

Turning now to FIG. 7, a processing after selection of the acquisition device will be described.

[Step S33] The communication device applying section 160 transmits the device information registration request to the gateway device 400.

FIG. 13 shows a data structure example of the device information registration request. In a device information registration request 45, information is set indicating that this request is a registration request of the device information. Further, the request 45 has the items of an action, a content and acquisition device information. In the item of the action, an action to be executed by the registered device is set. In this example, the action which means "data acquisition" is set. In the item of the content, information for uniquely identifying data for acquisition is set. Further, in the request 45, the device information 41 of the acquisition device is set as acquisition device information. In the example of FIG. 13, the device information 41 of the data acquisition device 200 is set.

Turning now to FIG. 7, a processing after transmission of the device information registration request 45 will be described.

[Step S34] The communication device application receiving section 420 of the gateway device 400 registers in the issued ticket management table 440 a content of the device information 41 included in the device information registration request 45. Then, the section 420 requests the access ticket issuing section 430 to issue the access ticket.

[Step S35] The access ticket issuing section 430 issues an access ticket 46 in response to the device information registration request 45. Then, the section 430 transmits the issued access tickets 46 to the portable terminal device 100. At the same time, the section 430 registers in the issued ticket management table 440 a content of the issued access tickets 46.

FIG. 14 shows a data structure example of the access ticket. The access ticket 46 has the items of ticket data and an expiration date. In the item of the ticket data, data (ticket data) for uniquely identifying the access ticket 46 is set. The ticket data is key information for accessing the protected network 30. The ticket data used herein is, for example, a value randomly generated by the access ticket issuing section 430. The ticket data may be generated using a hash function, based on a path and file information of the provided content, an ID of the acquisition device, or a secret key of the gateway device 400. In the item of the expiration date, the expiration date of the access ticket 46 is set. The expiration date is calculated, for example, by adding the predetermined time to the date when the access ticket issuing section 430 acquires the device information registration request.

The content of the device information registration request 45 shown in FIG. 13 and the access ticket 46 corresponding to the request 45 are associated with each other and registered in the issued ticket management table 440.

FIG. 15 shows a data structure example of the issued ticket management table. The table 440 has columns of the device ID, device type, ticket data and expiration date. Laterally-arranged information units of each column are associated with each other to thereby constitute one issued ticket information unit.

In the column of the device ID, a value of the ID item within the device information 41 added to the device information registration request 45 is set. In the column of the device type, a value of the device type item within the device information 41 added to the request 45 is set. In the column of the ticket data, a value of the ticket data item of the access ticket 46 is set. In the column of the expiration date, a value of the expiration date item of the access ticket 46 is set.

The issued ticket management table 440 shown in FIG. 15 is an example in the case of setting up no restriction on an accessible content. In the case of issuing an individual access ticket to each content as an access object, a column of the content URL is added to the table 440 shown in FIG. 15. In the column of the content URL, a value of the content item of the device information registration request 45 is set.

Turning now to FIG. 7, a processing after issuance of the access ticket will be described.

[Step S36] The access ticket mediating section 170 of the portable terminal device 100 acquires the access ticket 46 transmitted from the gateway device 400 and transfers the ticket 46 to the data acquisition instructing section 180.

[Step S37] The data acquisition instructing section 180 of the device 100 acquires from the communication device applying section 160 a content of the device information registration request 45 transmitted to the gateway device 400. Then, the section 180 transmits a data acquisition instruction 47 to the data acquisition device 200 based on the acquired information.

FIG. 16 shows a data structure example of the data acquisition instruction. The data acquisition instruction 47 has items of an action and a content. In the item of the action, a processing to be executed by the data acquisition device 200 is set. In the example of FIG. 16, the action which means reproduction of the acquired data is set. In the item of the content, a URL (including a parameter designated in the data acquisition) of the data for acquisition is set. Further, the access ticket 46 is added to the data acquisition instruction 47.

Turning now to FIG. 7, a processing after transmission of the data acquisition instruction 47 will be described.

[Step S38] The data acquiring section 220 of the data acquisition device 200 transmits, to the gateway device 400, a data request 48 having a content item in which the URL set in the content item in the data acquisition instruction 47 is set.

FIG. 17 shows a data structure example of the data request. The data request 48 has items of an action, content, ticket data and device ID. In the item of the action, a type of the desired processing is set. In this example, an action which means the data acquisition is set. When the data request 48 is a HTTP request, the action is represented by a "GET" method. In the item of the content, a URL (including a parameter) of the data for acquisition is set. In the item of the ticket data, a value of the ticket data included in the access ticket 46 is set. In the item of the device ID, an ID for uniquely identifying the data acquisition device 200 is set.

Turning now to FIG. 7, a processing after transmission of the data request 48 will be described.

[Step S39] The access controller 450 of the gateway device 400, when receiving the data request 48 transmitted from the data acquisition device 200, determines whether the request 48 includes a proper access ticket. This processing will be described in detail later.

[Step S40] The controller 450, when checking that the data request 48 includes a proper access ticket, transmits a data request 49 to the data server device 500.

FIG. 18 shows a data structure example of the data request output from the gateway device. The data request 49 has the items of an action and a content. In the item of the action, a type of the desired processing is set. In the item of the content, a URL (including a parameter) of the data for acquisition is set. That is, the data request 49 is a request excluding the ticket data and device ID items from the data request 48 output from the data acquisition device 200.

Turning now to FIG. 7, a processing after transmission of the data request from the gateway device 400 will be described.

[Step S41] The data publishing section 530 of the data server device 500, when receiving the data request 49, acquires from the content storing section 510 the data corresponding to the URL shown in the item of the content. Then, the section 530 transmits the acquired data 50 to the gateway device 400, for example, by HTTP.

[Step S42] The gateway device 400 transfers the acquired data 50 to the data acquisition device 200.

[Step S43] The data acquiring section 220 of the data acquisition device 200 receives the data 50 transferred from the gateway device 400 as well as stores the data 50 in the data storing section 230.

[Step S44] The data reproducing section 240 reproduces the data 50 stored in the section 230. For example, when the data 50 is video data, the section 240 reproduces and displays the video.

Thus, the data provided by the data server device 500 within the protected network 30 can be transferred to the data acquisition device 200 within the local network 20 by the operation from the portable terminal device 100.

Next, a ticket checking processing will be described in detail.

Figure 19:
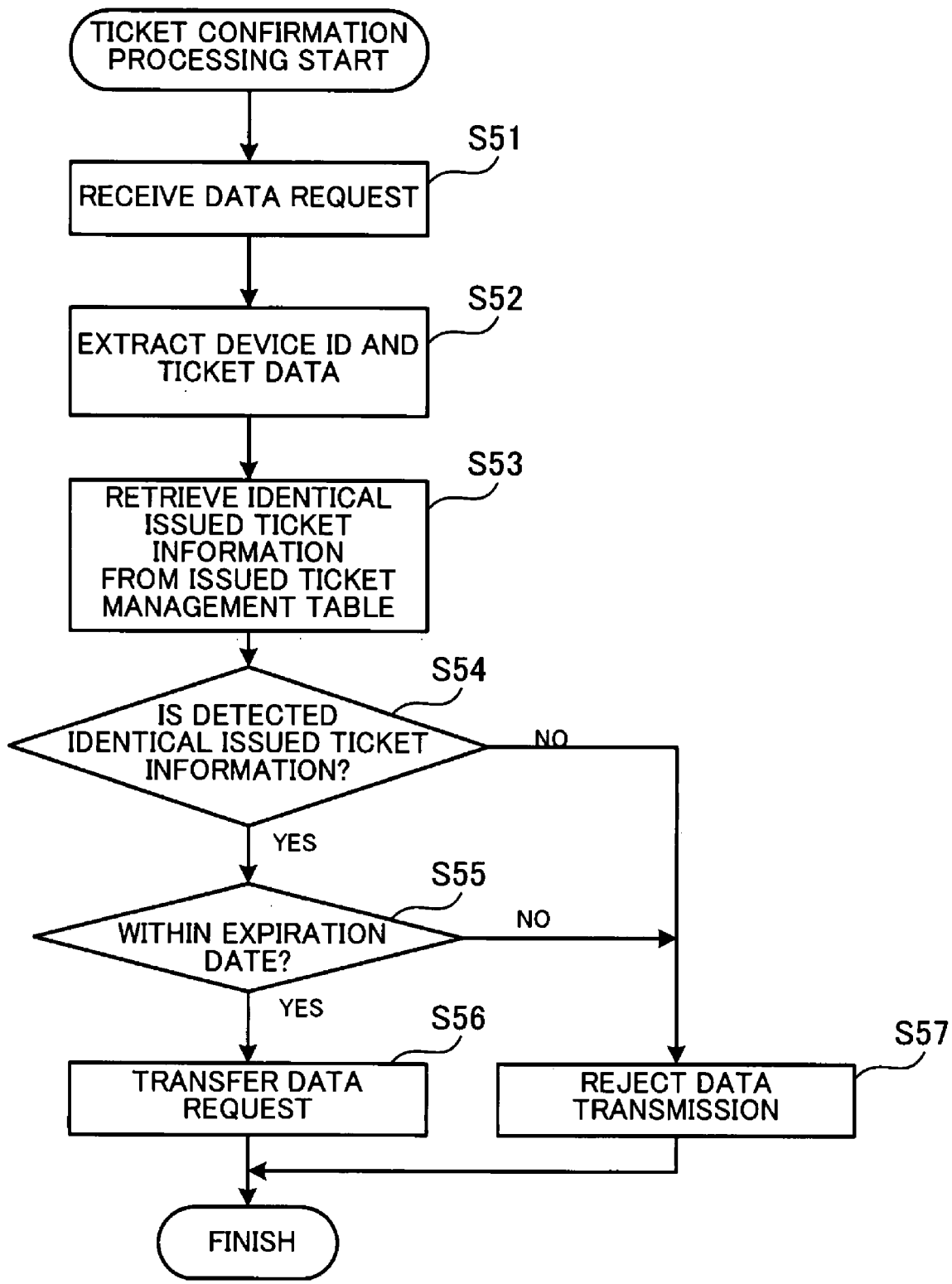
FIG. 19 is a flowchart showing a procedure of a ticket checking processing.

FIG. 19 is a flowchart showing a procedure of a ticket checking processing. The processing shown in FIG. 19 will be described below according to the step numbers.

[Step S51] The access controller 450 of the gateway device 400 receives the data request 48.

[Step S52] The controller 450 extracts the ticket data and the device ID from the data request 48.

[Step S53] The controller 450 retrieves, from the issued ticket management table 440, the issued ticket information having a combination of the ticket data and the device ID, the value of which agrees with that of a combination of the extracted ticket data and device ID.

[Step S54] The controller 450 determines whether the issued ticket information having a combination of the ticket data and the device ID, the value of which agrees with that of a combination of the extracted ticket data and device ID is detected in the retrieval in step S53. When such issued ticket information is detected, the processing goes to step S55, whereas when such information is not detected, the processing goes to step S57.

[Step S55] The controller 450 determines whether the current date and time is within the expiration date set in the detected issued ticket information. When the present date and time is within the expiration date, the processing goes to step S56, whereas when the current date and time is beyond the expiration date, the processing goes to step S57.

[Step S56] The controller 450 transfers to the data server device 500 the data request 49 excluding the ticket data and the device ID from the received data request 48. Thereafter, the processing is completed.

[Step S57] The controller 450 rejects the data transmission in response to the data request 48 and transmits an error message to the data acquisition device 200. Thereafter, the processing is completed.

As described above, even if the ID of the data acquisition device 200 is not previously registered in the gateway device 400 within the protected network 30, the data within the data server device 500 can be transmitted to the data acquisition device 200 by the external operation through the Internet 10. Thus, the data transfer to the data acquisition device 200 in a visiting place is facilitated.

Moreover, the access ticket issued by the gateway device 400 is transferred to the portable terminal device 100 through the VPN. Then, the gateway device 400 permits only the access from the device 200 having the access ticket. Therefore, the external access to the protected network 30 becomes possible while maintaining the security of the protected network 30.

Further, the transfer of the acquired access ticket to the device 200 is automatically executed by the device 100. Therefore, a user's trouble can be saved.

Moreover, the data being transferred does not pass through the device 100. Therefore, the data transfer rate does not depend on the data, processing capacity and data communications capacity of the device 100.

Second Embodiment

Next, a second embodiment will be described. The second embodiment is a system for transferring data to the data acquisition device through a storage server on the Internet 10 without permitting the data acquisition device to directly access the protected network 30.

Figure 20:
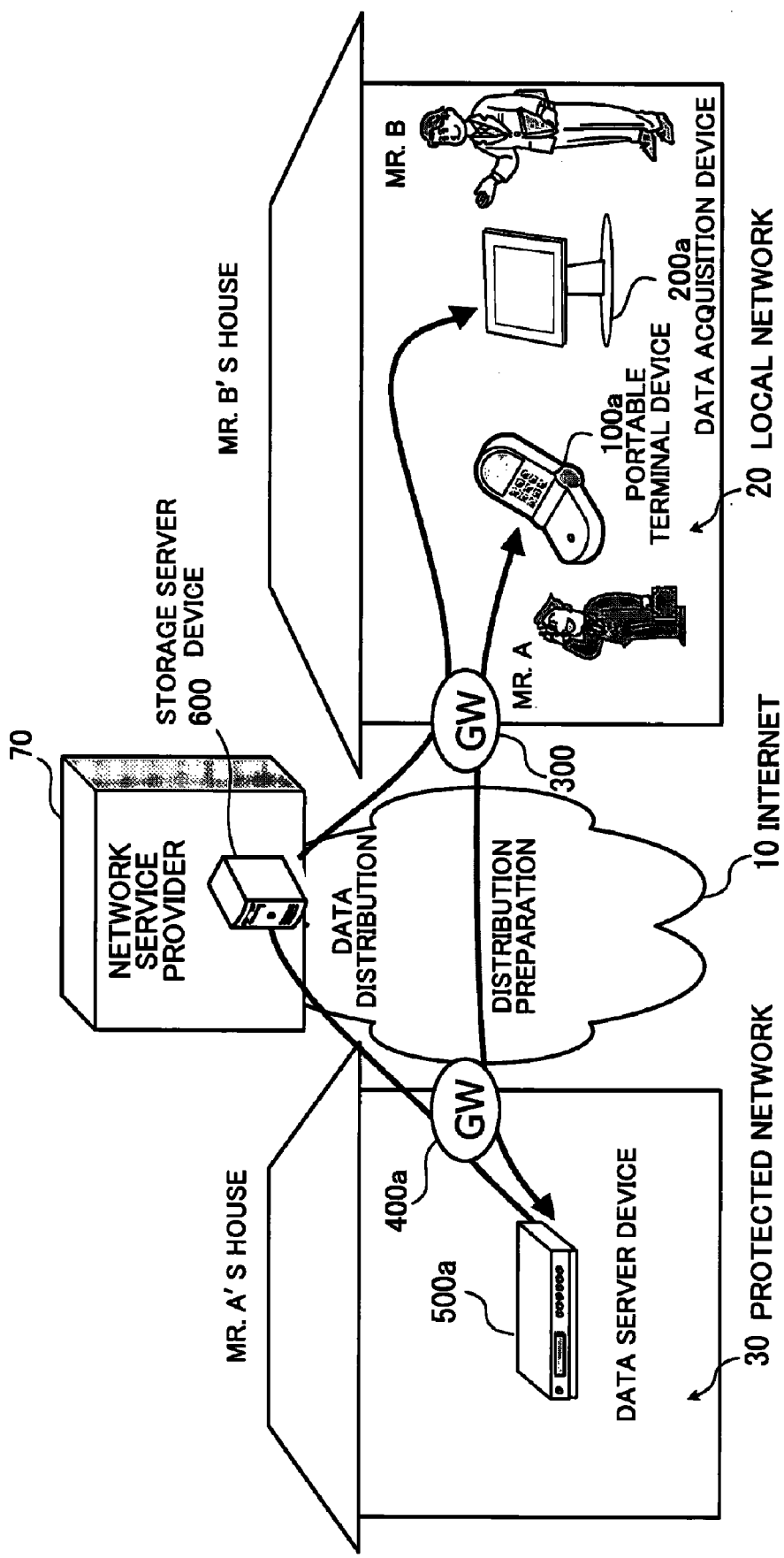
FIG. 20 shows a system configuration example of a second embodiment.

FIG. 20 shows a system configuration example of the second embodiment. In FIG. 20, the same elements as those of the first embodiment shown in FIG. 2 are indicated by the same reference numerals as in FIG. 2 and the description is omitted. In the second embodiment, an arrangement of the respective devices in the local network 20 and the protected network 30 as well as a connection relation therebetween are the same as in the first embodiment. However, the second embodiment differs from the first embodiment in the functions of a portable terminal device 100a, a data acquisition device 200a, a gateway device 400a and a data server device 500a.

The data acquisition device 200a in Mr. B's house is, for example, a display unit connectable to a network. The device 200a has a function of receiving instructions from the device 100a and acquiring data from a storage server device 600. Further, the device 200a can decrypt the data acquired from the device 600 using an encryption key received from the device 100a.

The data server device 500a in Mr. A's house publishes data through a predetermined protocol such as HTTP and FTP. Further, the device 500a can encrypt the data using the encryption key received from the device 100a and transmit the encrypted data to the storage server device 600. The gateway device 400a protects the protected network 30 by a normal gateway function. Specifically, the device 400a passes only a communication request from the protected network 30 to the Internet 10 and rejects a communication request from the Internet 10. Further, the device 400a has a communication function with external devices through the VPN.

Mr. A has the portable terminal device 100a with a wireless LAN communication function. The device 100a has a VPN function. Using this VPN function, the device 100a can perform a VPN communication with the gateway device 400a and connect to the protected network 30 in Mr. A's house through the Internet 10. Further, the device 100a can connect to the local network 20 in Mr. B's house, using a wireless LAN communication function. The device 100a has a function of detecting, using a protocol such as UPnP, a device within the connected wireless LAN. Further, the device 100a can transmit an encryption key to the data server device 500a installed in Mr. A's house and instruct the device 500a to execute data transfer as well as can transmit the same encryption key to the data acquisition device 200a and instruct the device 200a to execute data acquisition.

A network service provider 70 has the storage server device 600. The device 600 is connected to the Internet 10 and is accessible from both of the data server device 500a and the data acquisition device 200a. The device 600 stores data transmitted from the device 500a. When receiving from the device 200a an acquisition request of the data, the device 600 transmits the data to the device 200a. For the transmission and reception of data, a standard protocol such as FTP or HTTP is used.

Here, Mr. A visits Mr. B's house with the portable terminal device 100a. Then, Mr. A first connects the device 100a to the local network 20. Further, Mr. A operates the device 100a to connect the device 100a to the protected network 30 using the VPN function. Then, based on the operation input to the device 100a by Mr. A, the device 100a makes the preparation for distributing the data within the data server device 500 to the data acquisition device 200a through the device 600. Thereafter, the data server device 500a transmits the data to the storage server device 600 and the device 200a acquires the data from the storage server device 600.

Thus, in the second embodiment, there is no need to change the setting of the gateway device 400a of the protected network 30. In other words, the gateway device 400a can maintain a state of blocking all the accesses (except for the access through VPN) from the external network. Therefore, a processing of transferring the data within the data server device 500a to the data acquisition device 200a of the local network 20 by the control from the device 100a can be realized without impairing security of the protected network 30.

In the second embodiment, there occurs no communication that is restricted by the gateway device 300 of the local network 20 as well as by the gateway device 400a of the protected network 30. Accordingly, description on the operations of the gateway device 300 is omitted below except when the description is particularly required.

Figure 21:
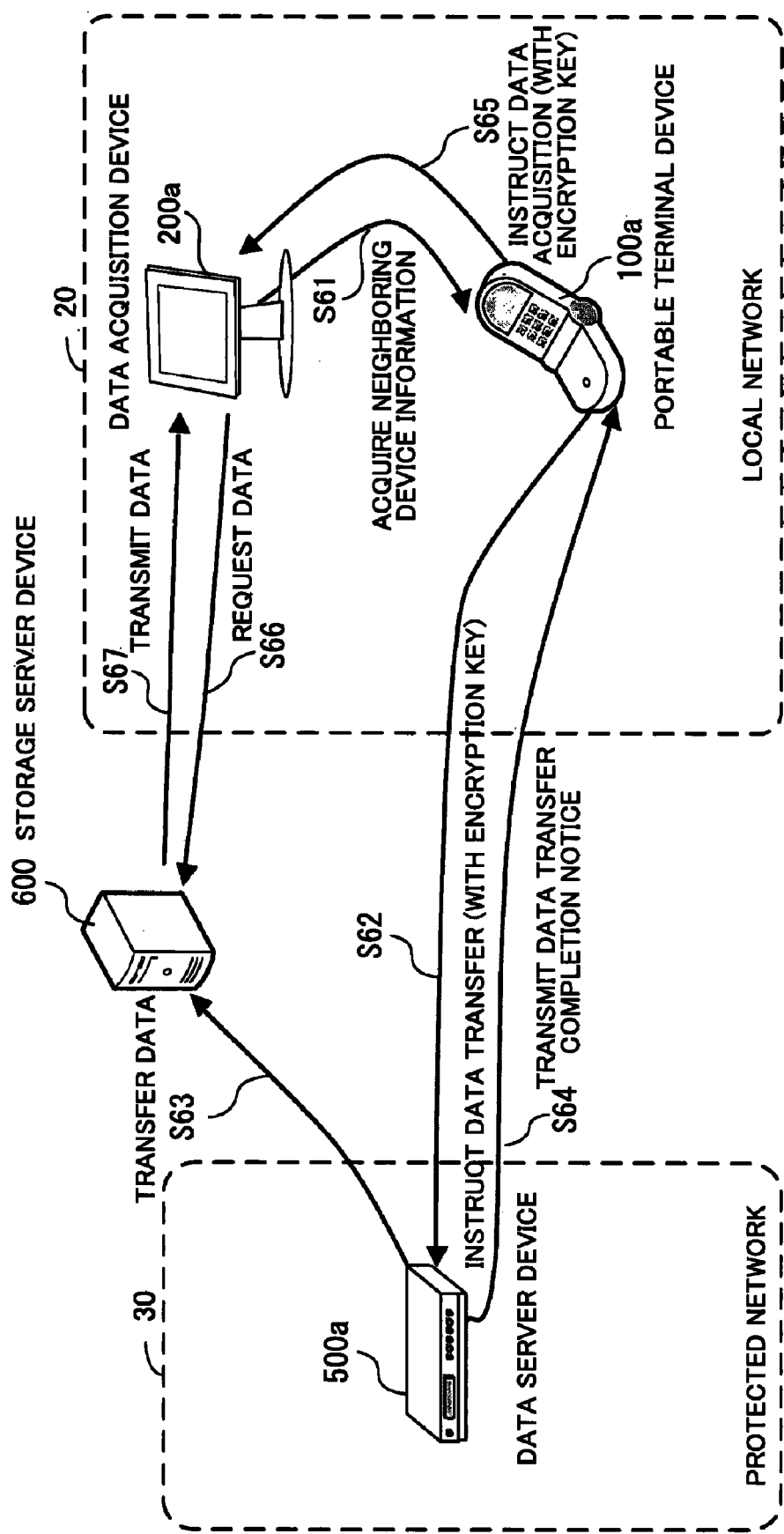
FIG. 21 shows an outline of operations up to data acquisition in the system of the second embodiment.

FIG. 21 shows an outline of operations up to the data acquisition in the system of the second embodiment. The portable terminal device 100a acquires neighboring (within the local network 20) device information from a device connected to the local network 20 (step S61). The device 100a can perform this operation using a protocol such as UPnP. Thus, the device information of the data acquisition device 200a is transferred to the device 100a.

Next, the device 100a transmits a data transfer instruction to the data server device 500a of the protected network 30 (step S62). This data transfer instruction includes an encryption key. The device 500a encrypts, using the encryption key transmitted from the device 100a, the data designated by the data transfer instruction. Then, the device 500a transfers the data to the storage server device 600 (step S63). Thereafter, the device 500a transmits a data transfer completion notice to the device 100a (step S64).

The device 100a, when receiving the data transfer completion notice, transmits a data acquisition instruction to the device 200a (step S65). This data acquisition instruction includes the encryption key.

The acquisition device 200a transmits to the storage server device 600 a data request on the data indicated by the data acquisition instruction (step S66). Then, the device 600 transmits the data to the device 200a (step S67). The device 200a decrypts the acquired data using the encryption key included in the data acquisition instruction and reproduces the decrypted data.

A hardware configuration of the portable terminal device 100a for realizing the operations shown in FIG. 21 is the same as that of the portable terminal device 100 according to the first embodiment shown in FIG. 4. The hardware configurations of the data acquisition device 200a, the data server device 500a and the storage server device 600 each are the same as that of the gateway device 400 according to the first embodiment shown in FIG. 5.

Next, the functions for realizing the processing according to the present embodiment will be described.

Figure 22:
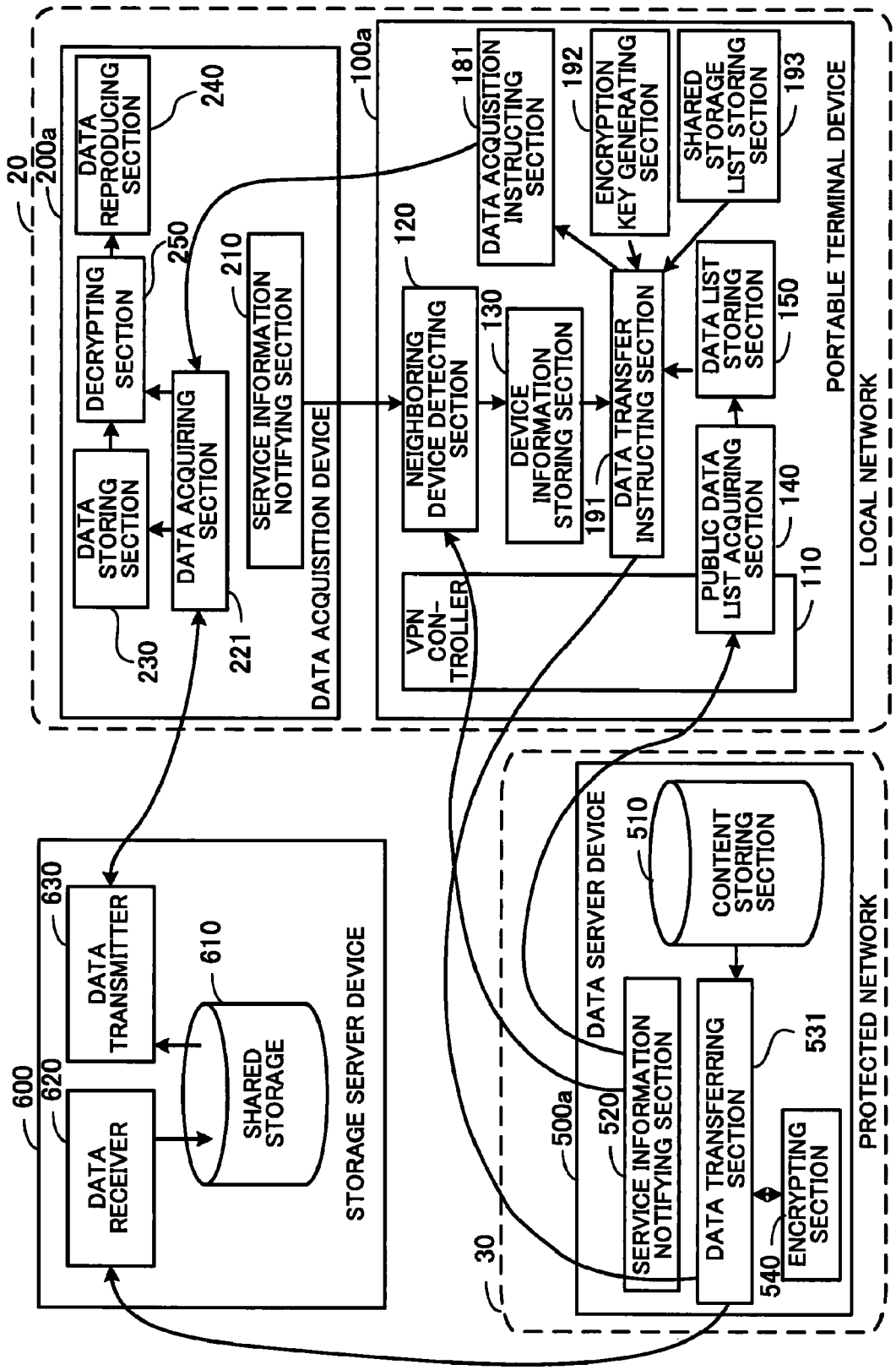
FIG. 22 is a block diagram showing the functions of the respective devices in the second embodiment.

FIG. 22 is a block diagram showing the functions of the respective devices in the second embodiment. In FIG. 22, the same elements as those of the first embodiment shown in FIG. 6 are indicated by the same reference numerals as in FIG. 6 and the description is omitted.

In the portable terminal device 100a, a data transfer instructing section 191 is provided in place of the communication device applying section 160 according to the first embodiment. Further, an encryption key generating section 192 and a shared storage list storing section 193 are newly provided. Additionally, the function of a data acquisition instructing section 181 differs from that of the data acquisition instructing section 180 according to the first embodiment.

The data transfer instructing section 191 selects, in response to an operation input from a user (e.g., Mr. A), a communication device permitted to connect to the protected network 30. Further, from among the data published by the data server device 500a, the section 191 selects, in response to an operation input from a user (e.g., Mr. A), data to be published to a communication device outside the protected network 30. Then, the section 191 transmits to the data server device 500a a data transfer instruction for instructing the transfer of the selected data to the storage server device 600. The section 191 includes in the data transfer instruction an encryption key generated by the encryption key generating section 192. Further, the data transfer instruction includes location information of a shared storage used as a data transfer destination. The shared storage used as a data transfer destination is determined from among the shared storages previously registered in the shared storage list storing section 193, for example, in response to an operation input from a user (e.g., Mr. A).

Further, the data transfer instructing section 191, when receiving the data transfer completion notice from the data server device 500a, transfers to the data acquisition instructing section 181 the information for designating the selected communication device, the information (URL) on a data storage location in the storage server device 600, and the encryption key.

The encryption key generating section 192, when the data transfer instructing section 191 transmits the data transfer instruction, generates an encryption key. The encryption key includes, for example, a randomly generated numerical sequence. The section 192 may generate the encryption key by applying a hash function to the path and file information of the data for transfer, or to the device ID of the data acquisition device 200a and to the secret key previously kept by the portable terminal device 100a.

The shared storage list storing section 193 is a storage device for storing a shared storage list that shows a location of the shared storage to which the data can be transferred from the data server device 500a. For example, a part of the storage area of the memory 107 of the portable terminal device 100a is used as the shared storage list storing section 193.

The data acquisition instructing section 181, when receiving the information for designating a selected communication device, the information on a data storage location and the encryption key from the data transfer instructing section 191, transmits the data acquisition instruction to the selected communication device (in this example, assume that the data acquisition device 200a is selected). The data acquisition instruction includes the information on a data storage location and the encryption key.

In the data acquisition device 200a, the function of the data acquiring section 221 differs from that of the data acquiring section 220 according to the first embodiment. Further, a decrypting section 250 is provided between the data storing section 230 and the data reproducing section 240.

The data acquiring section 221, when receiving the data acquisition instruction, transmits to the storage server device 600 an acquisition request of the data indicated by the data acquisition instruction. When receiving the data from the device 600, the section 221 stores the data in the data storing section 230. Further, the section 221 transfers to the decrypting section 250 the encryption key included in the data acquisition instruction.

The decrypting section 250 decrypts the data stored in the data storing section 230, using the encryption key transferred from the data acquiring section 221. Then, the section 250 transfers the decrypted data to the data reproducing section 240.

In the data server device 500a, a data transferring section 531 is provided in place of the data publishing section 530 according to the first embodiment. Further, an encrypting section 540 is newly provided. In these respects, the section 500a differs from the data server device 500 according to the first embodiment.

The data transferring section 531, when receiving the data transfer instruction from the portable terminal device 100a, acquires from the content storing section 510 the data designated by the data transfer instruction. Then, the section 531 transmits the acquired data to the storage server device 600. When the data transmission is completed, the section 531 transmits a data transmission completion notice to the portable terminal device 100a.

The storage server device 600 has a shared storage 610, a data receiver 620 and a data transmitter 630.

The shared storage 610 is a storage device for storing data. For example, a part of storage area of a hard disc device provided in the storage server device 600 is used as the shared storage 610.

The data receiver 620 receives the data transmitted from the data server device 500a. Then, the receiver 620 stores the received data in the shared storage 610.

The data transmitter 630 takes out data from the shared storage 610 in response to the data request from the data acquisition device 200a. Then, the transmitter 630 transmits the taken-out data to the device 200a.

Figure 23:
FIG. 23 shows a data structure example of a shared storage list.

FIG. 23 shows a data structure example of the shared storage list. The shared storage list storing section 193 stores a shared storage list with the columns of a shared storage name and a URL.

In the column of the shared storage name, a name for identifying the shared storage is set. In the column of the URL, a location of the usable shared storage (e.g., a domain name of the storage server device 600 and a folder path in a file system) is designated by the URL.

The data transfer instructing section 191 displays the shared storage name on the screen of the portable terminal device 110a. Then, a user (e.g., Mr. A) selects an arbitrary shared storage name. Thus, a URL corresponding to the shared storage name is determined as the URL of the data transfer destination.

Next, a procedure for transferring data kept in Mr. A's house to the data acquisition device 200 in Mr. B's house and for reproducing the data will be described in detail.

Figure 24:
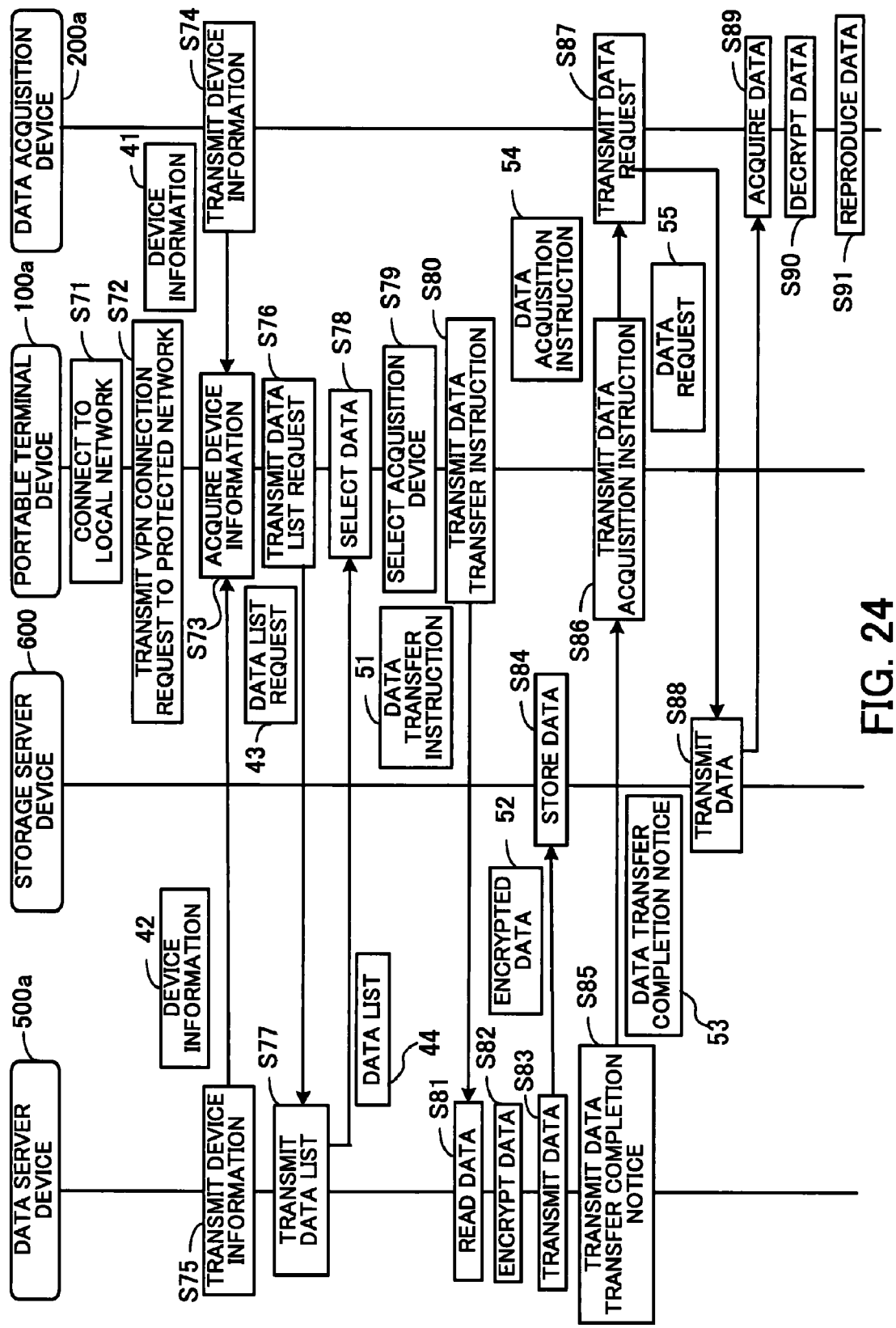
FIG. 24 is a sequence diagram showing a procedure of a data acquisition processing in the second embodiment.

FIG. 24 is a sequence diagram showing a procedure of a data acquisition processing in the second embodiment. Processings shown in FIG. 24 will be described below according to the step numbers. The respective processings in steps S71 to S79 shown in FIG. 24 are the same as those in steps S21, S22, S24 to S26, S27, S29, S31 and S32 shown in FIG. 7 in the first embodiment, respectively. Therefore, descriptions are omitted. The processings (steps S23, S28 and S30) performed by the gateway device 400 shown in FIG. 7 are similarly performed by the gateway device 400a; however, the processings are omitted in FIG. 24.

The data transfer instructing section 191 generates an encryption key and transmits the data transfer instruction 51 including the encryption key to the data server device 500a.

Figure 25:
FIG. 25 shows a data structure example of a data transfer instruction.

FIG. 25 shows a data structure example of the data transfer instruction. A data transfer instruction 51 has items of an action, content, shared storage and encryption key. In the item of the action, information is set indicating that this message is a data transfer instruction. In the item of the content, information for uniquely identifying the data selected by the processing in step S78 is set. In the item of the shared storage, information (e.g., a URL) for designating a folder to store the data within the storage server device 600 is set. In the item of the encryption key, the encryption key generated by the data transfer instructing section 191 is set.

The data storage location designated in the shared storage item is selected from among the shared storage list stored in the shared storage list storing section 193. As shown in FIG. 25, a protocol used in the data transfer, such as "ftp", may be designated in the shared storage item. When the data transfer protocol is designated, the data transferring section 531 of the data server device 500a performs the data transfer by the designated protocol.

Further, the information indicating the data storage location may be previously set in the data server device 500a without including the information in the data transfer instruction 51.

The shared storage 610 is desired to be accessible also from the portable terminal device 100a. When the storage 610 is accessible from the device 100a, the device 100a can check the previously stored data. Therefore, when plural shared storages accessible from the device 100a are provided, the whole content of the shared storage list registered in the shared storage list storing section 193 may be included in the data transfer instruction 51. In this case, the data transferring section 531 of the data server device 500a selects, from the shared storage list, a shared storage accessible from the section 531. Then, the section 531 transfers the data to the selected shared storage.

The encryption key included in the data transfer instruction 51 is generated by the encryption key generating section 192 and transferred to the data transfer instructing section 191.

Turning now to FIG. 24, a processing after transmission of the data transfer instruction 51 will be described.

[Step S81] The data transferring section 531, when receiving the data transfer instruction 51, reads out the data from the content storing section 510 based on the information that is set in the item of the content.

[Step S82] The encrypting section 540 receives the data read out by the data transferring section 531 and encrypts the data by the encryption key included in the data transfer instruction 51. Then, the section 540 transfers an encrypted data 52 to the data transferring section 531.

[Step S83] The section 531 transmits the encrypted data 52 to a folder within the shared storage 610 designated in the shared storage item of the data transfer instruction 51.

[Step S84] The data receiver 620 of the storage server device 600 stores in the shared storage 610 the encrypted data 52 transmitted from the data server device 500a.

[Step S85] The data transferring section 531, when completing the transmission of the encrypted data 52, transmits a data transfer completion notice 53 to the portable terminal device 100a.

FIG. 26 shows a data structure example of the data transfer completion notice. In the data transfer completion notice 53, information indicating the data transfer completion is set. Further, the notice 53 has the items of a content and a data URL. In the item of the content, information for uniquely identifying the transferred data is set. In the item of the data URL, information indicating a data storage location within the storage server device 600 and a data name (file name) is set.

Turning now to FIG. 24, a processing after transmission of the data transfer completion notice 53 will be described.

[Step S86] The data transfer instructing section 191, when receiving the data transfer completion notice 53, transfers to the data acquisition instructing section 181 the identification information (e.g., the access URL within the device information 41 transmitted from the data acquisition device 200a) of the data acquisition device 200a, the data URL indicated in the data transfer completion notice 53 and the encryption key added to the data transfer instruction 51. Then, the section 181 transmits a data acquisition instruction 54 to the data acquisition device 200a.

FIG. 27 shows a data structure example of the data acquisition instruction. In the data acquisition instruction 54, the items of an action, a data URL and an encryption key are set. In the item of the action, information is set indicating that this message is a reproduction instruction. In the item of the data URL, information indicating a data storage location within the storage server device 600 and the data name (file name) is set. In the item of the encryption key, an encryption key generated by the data transfer instructing section 191 is set.

Turning now to FIG. 24, a processing after transmission of the data acquisition instruction 54 will be described.

[Step S87] The data acquiring section 221 of the data acquisition device 200a transmits a data request 55 to the storage server device 600. The data structure of the data request 55 is the same as that of the data request 49 in the first embodiment shown in FIG. 18. Note, however, that a URL corresponding to the data stored in the shared storage 610 of the storage server device 600 is set in the item of the content.

[Step S88] The data transmitter 630 of the storage server device 600 acquires the encrypted data 52 from the shared storage 610 in response to the data request 55. Then, the transmitter 630 transmits the encrypted data 52 to the data acquisition device 200a.

[Step S89] The data acquiring section 221 of the data acquisition device 200a receives the encrypted data 52 transmitted from the storage server device 600 and stores the data in the data storing section 230.

[Step S90] The decrypting section 250 decrypts the encrypted data 52 stored in the data storing section 230, using the encryption key included in the data acquisition instruction 54. Then, the section 250 transfers the decrypted data to the data reproducing section 240.

[Step S91] The data reproducing section 240 reproduces and displays the data decrypted by the decrypting section 250.

As described above, based on the operation control of the portable terminal device 100a, the data can be transferred from the data server device 500a of the protected network 30 to the storage server device 600 and can be acquired by the data acquisition device 200a. In other words, using the device 100a only as a controller, the data transfer can be performed without causing the data to pass through the device 100a. As a result, the fast data transfer can be performed without depending on the capacity of the device 100a.

Moreover, the data is encrypted and transferred. Therefore, the data can be prevented from being peeped by a third party. Further, the gateway device 400a of the protected network 30 has no need to change the setting that denies the access through the Internet 10. Therefore, the protected network 30 need not be exposed to risks.

In the above example, the portable terminal device 100a generates the encryption key. Also the data server device 500a can generate the encryption key. In this case, the encryption key is added to the data transfer completion notice transmitted from the data server device 500a to the device 100a. Then, the device 100a transmits the encryption key included in the data transfer completion notice to the data acquisition device 200a together with the data acquisition instruction.

Further, a system based on a standard specification may be employed for the notification of the encryption key or for the release of encryption. The standard specification includes, for example, a DTCP-IP (Digital Transmission Content Protection over Internet Protocol).

The processing functions according to the first and second embodiments can be realized using a computer. In this case, there are provided programs descriptive of contents to be processed by the functions of the portable terminal devices 100 and 100a, data acquisition devices 200 and 200a, gateway device 400, data server devices 500 and 500a, and storage server device 600. By executing the program using a computer, the above-described processing functions are realized on the computer. The program descriptive of the processing contents can be recorded on a computer-readable recording medium. Examples of the computer-readable recording medium include a magnetic recording system, an optical disk, a magnetooptical medium and a semiconductor memory. Examples of the magnetic recording system include a hard disk drive (HDD), a flexible disk (FD) and a magnetic tape. Examples of the optical disk include a DVD (Digital Versatile Disc), a DVD-RAM (Digital Versatile Disc-Random Access Memory), a CD-ROM (Compact Disc-Read Only Memory) and a CD-R (Recordable)/RW (Rewritable). Examples of the magnetooptical medium include a MO (Magneto-Optical disk).

In the case of distributing a program, portable recording media such as a DVD and CD-ROM having recorded thereon the program are sold. Further, the program may be stored in a storage device of a server computer to allow it to be transferred from the server computer to another computer through the network.

A computer which executes programs stores, in its own storage device, the programs such as a program recorded on a portable recording medium or a program transferred from a server computer. Then, the computer reads a program from its own storage device and executes a processing according to the program. The computer can also directly read a program from the portable recording medium and execute a processing according to the program. Further, the computer, every when a program is transferred from the server computer, can also sequentially execute a processing according to the received program.

In the present embodiment, the portable terminal device and the data acquisition device are connected through the wireless LAN and the local network. When plural wireless connection devices are provided (e.g., a case where a Bluetooth and a Wireless USB are provided in addition to a Wireless LAN and a mobile phone network), the portable terminal device and the data acquisition device may communicate not through the LAN but through the above devices.

In the present embodiment, the gateway devices 400 and 300 are clearly described in a server shape. Further, the gateway device realized using small devices with no keyboard or output device may be generally used. Likewise, the data server device may be realized using small devices.

Further, the present invention is not limited only to the above-described embodiments. Accordingly, various modifications may be made without departing from the spirit or scope of the general inventive concept as defined by the appended claims and their equivalents.

In the present invention, key information is transferred to the data acquisition device to thereby allow the data supplied by the data server device to be acquired from the data acquisition device through another network. As a result, the need for the portable terminal device to relay the acquired data is eliminated, so that effective data transfer can be performed without depending on the capacity of the portable terminal device.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable recording medium which records a remote control program for remotely acquiring data within a protected network, the remote control program causing a portable terminal device to perform an operation comprising:
   (a) acquiring from a device within a local network connected through a communication interface, device identification information for identifying the device;
   (b) storing the acquired device identification information;
   (c) receiving an operation input for designating, from among the stored device identification information, device identification information of a data acquisition device to execute a data acquisition process;
   (d) storing data identification information for identifying data stored in a data server device within the protected network connected to a local network through another network;
   (e) receiving an operation input for designating the data identification information on data as a transfer object from among the stored data identification information;
   (f) transmitting an access ticket issue request to a gateway device installed between the protected network and another network, the access ticket issue request requesting the gateway device to issue an access ticket indicating that external access to the protected network is permitted;
   (g) generating key information; and
   (h) when an access ticket including the generated key information for accessing the protected network is transmitted from the gateway device in response to the access ticket issue request, transmitting a data acquisition instruction including the access ticket and the data identification information of the data designated as the transfer object.

2. The non-transitory recording medium according to claim 1, wherein:
the remote control program further causes the portable terminal device to perform an operation comprising performing encrypted communication with the gateway device;
the transmitting access ticket issue request is through the encrypted communication; and receiving the access ticket through the encrypted communication.

3. The non-transitory recording medium according to claim 1, wherein the remote control program further causes the portable terminal device to perform an operation comprising acquiring, through the encrypted communication, the data identification information of the data published from the data server device within the protected network and then storing the acquired information in the data list storing.

4. The non-transitory recording medium according to claim 1, wherein the the device identification information of the data acquisition device is in the access ticket issue request.

5. A non-transitory computer-readable recording medium which records a remote control program for remotely acquiring data within a protected network, the remote control program causing a remote-control portable terminal device to perform an operation comprising:
(a) acquiring from a device within a local network connected through a communication interface, device identification information for identifying the device;
(b) storing the acquired device identification information;
(c) receiving an operation input for designating, from among the stored device identification information, the device identification information of a data acquisition device to execute a data acquisition process;
(d) storing data identification information for identifying data stored in a data server device within the protected network connected to a local network through another network;
(e) receiving an operation input for designating the data identification information on data as a transfer object from among the stored data identification information;
(f) generating key information;
(g) acquiring the data identification information of the data designated as the transfer object and then transmitting to the data server device a data transfer instruction including the acquired data identification information as well as the key information generated as an encryption key, the data transfer instruction instructing the data server device to transfer the data as the transfer object to a storage server device provided on another network; and
(h) transmitting to the data acquisition device a data acquisition instruction including the data identification information for accessing data transferred to the storage server device as well as the generated key information.

6. A portable terminal device for remotely controlling a device connected through a network, comprising:
a memory;
a microprocessor;
a device information acquiring unit which acquires, from a device within a local network connected through a communication interface, device identification information for identifying the device;
a device information storing unit which stores the device identification information acquired by the device information acquiring unit;
a data acquisition device designation receiving unit which receives an operation input for designating, from among the device identification information stored in the device information storing unit, the device identification information of a data acquisition device to execute a data acquisition process;
a data list storing unit which stores data identification information for identifying data stored in a data server device within a protected network connected to the local network through another network;
a transfer data designation receiving unit which receives an operation input for designating the data identification information on data as a transfer object from among the data identification information stored in the data list storing unit;
an access ticket issue requesting unit which transmits an access ticket issue request to a gateway device installed between the protected network and another network, the access ticket issue request requesting the gateway device to issue an access ticket indicating that external access to the protected network is permitted;
a key generating unit generates key information; and
a data acquisition instructing unit which, when an access ticket including the generated key information for accessing the protected network is transmitted from the gateway device in response to the access ticket issue request, transmits to the data acquisition device a data acquisition instruction including the access ticket and the data identification information of the data designated as the transfer object.

7. The portable terminal device according to claim 6, further comprising an encrypted communication unit which performs encrypted data communication with the gateway device, wherein: the access ticket issue requesting unit transmits the access ticket issue request through the encrypted communication unit; and the data acquisition instructing unit receives the access ticket through the encrypted communication unit.

8. The portable terminal device according to claim 6, further comprising a public data list acquiring unit which acquires through the encrypted communication unit the data identification information of the data published from the data server device within the protected network and then stores the information in the data list storing unit.

9. The portable terminal device according to claim 6, wherein the access ticket issue requesting unit includes the device identification information of the data acquisition device in the access ticket issue request.

10. A portable terminal device for remotely controlling a device connected through a network, comprising:
a memory;
a microprocessor;
a device information acquiring unit which acquires, from a device within a local network connected through a communication interface, device identification information for identifying the device;
a device information storing unit which stores the device identification information acquired by the device information acquiring unit;
a data acquisition device designation receiving unit which receives an operation input for designating, from among the device identification information stored in the device information storing unit, the device identification information of a data acquisition device to execute a data acquisition process;
a data list storing unit which stores data identification information for identifying data stored in a data server device within the protected network connected to the local network through another network, a transfer data designation receiving unit which receives an operation input for designating the data identification information on data as a transfer object from among the data identification information stored in the data list storing unit;

a key generating unit which generates key information;

a data transfer instructing unit which acquires from the data list storing unit the data identification information of the data designated as transfer object and then transmits to the data server device a data transfer instruction including the acquired data identification information as well as the key information generated as an encryption key by the key generating unit, the data transfer instruction instructing the data server device to transfer the data as the transfer object to a storage server device provided on another network; and a data acquisition instructing unit which transmits to the data acquisition device a data acquisition instruction including the data identification information for accessing data transferred to the storage server device as well as the key information generated by the key generating unit.

* * * * *